(12) United States Patent
Funabiki et al.

(10) Patent No.: US 8,266,658 B2
(45) Date of Patent: Sep. 11, 2012

(54) WIRELESS COMMUNICATION DEVICE AUTOMATICALLY CONNECTING FOR HDMI DEVICES

(75) Inventors: Makoto Funabiki, Osaka (JP); Akihiro Tatsuta, Kyoto (JP); Hiroshi Ohue, Osaka (JP)

(73) Assignee: Panasonic Corporation, Osaka (JP)

( * ) Notice: Subject to any disclaimer, the term of this patent is extended or adjusted under 35 U.S.C. 154(b) by 510 days.

(21) Appl. No.: 12/519,009

(22) PCT Filed: Dec. 17, 2007

(86) PCT No.: PCT/JP2007/074226
§ 371 (c)(1),
(2), (4) Date: Jun. 12, 2009

(87) PCT Pub. No.: WO2008/072763
PCT Pub. Date: Jun. 19, 2008

(65) Prior Publication Data
US 2010/0050214 A1 Feb. 25, 2010

(30) Foreign Application Priority Data
Dec. 15, 2006 (JP) .................................. 2006-338123

(51) Int. Cl.
*H04N 7/20* (2006.01)
*H04N 7/18* (2006.01)
*H04N 7/16* (2006.01)
*H04N 7/14* (2006.01)
*H04B 7/00* (2006.01)

(52) U.S. Cl. ............... 725/81; 725/73; 725/74; 725/80; 725/148; 348/14.01; 348/14.02; 370/310

(58) Field of Classification Search .................... 725/151
See application file for complete search history.

(56) References Cited

U.S. PATENT DOCUMENTS

| 7,378,984 B2 | 5/2008 | Suzuki et al. | |
| 2003/0112810 A1* | 6/2003 | Nakabayashi et al. | 370/401 |
| 2006/0159092 A1* | 7/2006 | Boers et al. | 370/390 |

(Continued)

FOREIGN PATENT DOCUMENTS

JP 2004-208290 7/2004
(Continued)

OTHER PUBLICATIONS

International Preliminary Report on Patentability issued Jun. 25, 2009 in the International (PCT) Application No. PCT/JP2007/074226.

(Continued)

*Primary Examiner* — Justin Shepard
(74) *Attorney, Agent, or Firm* — Wenderoth, Lind & Ponack, L.L.P.

(57) ABSTRACT

A wireless node device determines an origination port number, communicates with the wireless node device to exchange a destination port number determined by the wireless node device and the origination port number determined by the wireless node device, and associates the origination port number with the destination port number. Further, the wireless node device input formats supported by the wireless node device, reserves wireless resources for wirelessly transmitting the content data, determines one of the obtained input formats as an output format and notifies the wireless node device of the determined output format, and wirelessly transmits the content data to the wireless node device through a pair of ports indicated by the origination port number and the destination port number associated with each other.

25 Claims, 26 Drawing Sheets

U.S. PATENT DOCUMENTS

| | | | |
|---|---|---|---|
| 2006/0164561 A1* | 7/2006 | Lacy et al. | 348/706 |
| 2007/0169150 A1* | 7/2007 | Woolgar | 725/60 |
| 2007/0186015 A1* | 8/2007 | Taft et al. | 710/16 |
| 2007/0300266 A1* | 12/2007 | Casas et al. | 725/81 |

FOREIGN PATENT DOCUMENTS

| | | |
|---|---|---|
| JP | 2006-5491 | 1/2006 |
| JP | 2006-101428 | 4/2006 |
| JP | 2006-332835 | 12/2006 |

OTHER PUBLICATIONS

International Search Report issued Mar. 18, 2008 in the International (PCT) Application No. PCT/JP2007/074226.

High-Definition Multimedia Interface Specification, Version 1.1, HDMI Licensing, LLC, California, USA, May 20, 2004.

* cited by examiner

Fig.5

DEVICE CAPABILITY MEMORY 24

| DEVICE ID | DEVICE TYPE | HIGH-SPEED TRANSMISSION CAPABILITY | HIGH-SPEED RECEPTION CAPABILITY | MAC ADDRESS | DEVICE NAME | INPUT FORMAT |
|---|---|---|---|---|---|---|
| 0 | TV | NO | YES | A1 | TV1 | F1 |
| 1 | DVD PLAYER | YES | NO | A2 | DVD1 | |
| 2 | STB | YES | NO | A3 | STB1 | |
| ... | ... | ... | ... | ... | ... | ... |

Fig.19

CONNECTION INFORMATION MEMORY 25

| DEVICE ID OF SINK DEVICE | ORIGINATION PORT NUMBER | DESTINATION PORT NUMBER | STREAM ID |
|---|---|---|---|
| 0 | 1 | 1 | 1 |
| ... | ... | ... | ... |

Fig.20

CONNECTION INFORMATION MEMORY 15

| DEVICE ID OF SOURCE DEVICE | ORIGINATION PORT NUMBER | DESTINATION PORT NUMBER | STREAM ID |
|---|---|---|---|
| 1 | 1 | 1 | 1 |
| 2 | 1 | 2 | 2 |
| ... | ... | ... | ... |

Fig.29

DEVICE CAPABILITY MEMORY 124

| DEVICE ID | DEVICE TYPE | HIGH-SPEED TRANSMISSION CAPABILITY | HIGH-SPEED RECEPTION CAPABILITY | MAC ADDRESS | DEVICE NAME | PRIORITY | INPUT FORMAT |
|---|---|---|---|---|---|---|---|
| 0 | RECEIVER ADAPTER | NO | YES | A11 | RX ADAPTER 1 | 1 | F1,F2 |
| 1 | TRANSMITTER ADAPTER | YES | NO | A12 | TX ADAPTER 1 | | |
| 2 | STB | YES | NO | A13 | STB1 | | |
| 3 | TV | NO | YES | A14 | TV1 | 2 | F3 |
| ... | ... | ... | ... | ... | ... | ... | ... |

Fig.30

CONNECTION INFORMATION MEMORY 125

| DEVICE ID OF SINK DEVICE | ORIGINATION PORT NUMBER | DESTINATION PORT NUMBER | STREAM ID |
|---|---|---|---|
| 0 | 1 | 1 | 1 |
| ... | ... | ... | ... |

Fig.31

CONNECTION INFORMATION MEMORY 135

| DEVICE ID OF SINK DEVICE | ORIGINATION PORT NUMBER | DESTINATION PORT NUMBER | STREAM ID |
|---|---|---|---|
| 0 | 1 | 2 | 2 |
| 3 | 2 | 1 | 3 |
| ... | ... | ... | ... |

Fig.32

CONNECTION INFORMATION MEMORY 115

| DEVICE ID OF SOURCE DEVICE | ORIGINATION PORT NUMBER | DESTINATION PORT NUMBER | STREAM ID |
|---|---|---|---|
| 1 | 1 | 1 | 1 |
| 2 | 1 | 2 | 2 |
| ... | ... | ... | ... |

Fig.33

CONNECTION INFORMATION MEMORY 175

| DEVICE ID OF SOURCE DEVICE | ORIGINATION PORT NUMBER | DESTINATION PORT NUMBER | STREAM ID |
|---|---|---|---|
| 2 | 2 | 1 | 3 |
| ... | ... | ... | ... |

Fig.34

DEVICE CAPABILITY MEMORY 124

| DEVICE ID | DEVICE TYPE | HIGH-SPEED TRANSMISSION CAPABILITY | HIGH-SPEED RECEPTION CAPABILITY | MAC ADDRESS | DEVICE NAME | OUTPUT DEVICE ID | PRIORITY | INPUT FORMAT |
|---|---|---|---|---|---|---|---|---|
| 0 | RECEIVER ADAPTER | NO | YES | A11 | RX ADAPTER 1 | 1 | 1 | F1 |
|   |   |   |   |   |   | 2 | 2 | F2 |
| 1 | TRANSMITTER ADAPTER | YES | NO | A12 | TX ADAPTER 1 |   |   |   |
| 2 | STB | YES | NO | A13 | STB1 |   |   |   |
| 3 | TV | NO | YES | A14 | TV1 | 1 | 3 | F3 |
| ... | ... | ... | ... | ... | ... | ... | ... | ... |

CONNECTION INFORMATION MEMORY 125

| DEVICE ID OF SINK DEVICE | OUTPUT DEVICE ID | ORIGINATION PORT NUMBER | DESTINATION PORT NUMBER | STREAM ID |
|---|---|---|---|---|
| 0 | 1 | 1 | 1 | 1 |
| ... | ... | ... | ... | ... |

CONNECTION INFORMATION MEMORY 135

| DEVICE ID OF SINK DEVICE | OUTPUT DEVICE ID | ORIGINATION PORT NUMBER | DESTINATION PORT NUMBER | STREAM ID |
|---|---|---|---|---|
| 0 | 2 | 1 | 2 | 2 |
| 3 | 1 | 2 | 1 | 3 |
| ... | ... | ... | ... | ... |

Fig.37

CONNECTION INFORMATION MEMORY 115

| DEVICE ID OF SOURCE DEVICE | OUTPUT DEVICE ID | ORIGINATION PORT NUMBER | DESTINATION PORT NUMBER | STREAM ID |
|---|---|---|---|---|
| 1 | 1 | 1 | 1 | 1 |
| 2 | 2 | 1 | 2 | 2 |
| ... | ... | ... | ... | ... |

Fig.38

CONNECTION INFORMATION MEMORY 175

| DEVICE ID OF SOURCE DEVICE | OUTPUT DEVICE ID | ORIGINATION PORT NUMBER | DESTINATION PORT NUMBER | STREAM ID |
|---|---|---|---|---|
| 2 | 1 | 2 | 1 | 3 |
| ... | ... | ... | ... | ... |

WIRELESS COMMUNICATION DEVICE AUTOMATICALLY CONNECTING FOR HDMI DEVICES

TECHNICAL FIELD

The present invention relates to a wireless communication method capable of automatically performing connecting processes among a plurality of wireless communication devices in a wireless communication system in which video and audio data is transmitted among the wireless communication devices, and relates to such wireless communication devices and such a wireless communication system.

BACKGROUND ART

As a conventional system in which video and audio data is transmitted among a plurality of node devices, there has been a system using HDMI (High-Definition Multimedia Interface) defined in Non-Patent Document 1. In an HDMI system, a transmitter node device transmitting video and audio data (e.g., a video and audio player such as a DVD player) reads, via a DDC (Display Data Channel), EDID (Extended Display Identification Data) of a receiver node device (e.g., a TV, etc.) connected thereto through an HDMI cable, and thus obtains necessary format information. The format information includes a video format and an audio format that are supported by the receiver node device. Based on the obtained format information, the transmitter node device determines the format of data to be transmitted. Determined video format information is transmitted to the receiver node device with the information being multiplexed with video data.

When a user presses a playback button of the transmitter node device, the transmitter node device transmits an Active Source message to the receiver node device so that the receiver node device switches its input, and thus, the receiver node device can immediately display a video played back by the transmitter node device.

Further, Patent Document 1 discloses an AV system including a display device, a plurality of video devices connected to the display device, and remote controls corresponding to the video devices and for controlling them; and capable of operating the video devices by using the remote controls in direction of the display. When a button of each remote control is pressed, the remote control transmits to the display device a remote control code including at least one of a manufacturer code and device code corresponding to each video device. Based on the remote control code transmitted from one remote control, the display device connects to the display device one of the video devices corresponding to the remote control, thus switching its input.

Patent Document 1: Japanese Patent laid-open Publication No. 2004-208290, and

Non-Patent Document 1: High-Definition Multimedia Interface Specification, Version 1.1, HDMI Licensing, LLC, California in U.S.A., May 20, 2004.

DISCLOSURE OF INVENTION

Problems to be Solved by the Invention

However, in the case that video and audio data are wirelessly transmitted among a plurality of wireless communication devices, there is a problem of requiring a connecting process and a resource reserving process before transmitting the data, as well as requiring an input switching process.

An object of the present invention is to solve the above-described problem of the prior art, and to provide a wireless communication device and a wireless communication system, capable of one-touch playback of video and audio data over a wireless section.

Means for Solving the Problem

According to the first aspect of this invention, a wireless communication device that wirelessly transmits content data to a wireless receiving device is provided. The wireless communication device is provided with at least one port for wirelessly transmitting the content data. The wireless communication device determines an origination port number indicating a port for wirelessly transmitting the content data. The wireless communication device communicates with the wireless receiving device to exchange a destination port number determined by the wireless receiving device and the origination port number determined by the wireless communication device, the destination port number indicating a port for wirelessly receiving the content data in the wireless receiving device. The wireless communication device associates the origination port number with the destination port number. The wireless communication device obtains one or more input formats of the content data, supported by the wireless receiving device. The wireless communication device reserves wireless resources for wirelessly transmitting the content data. The wireless communication device determines one of the obtained input formats as an output format of the content data, and notifies the wireless receiving device of the determined output format. The wireless communication device wirelessly transmits the content data to the wireless receiving device through a pair of ports indicated by the origination port number and the destination port number associated with each other.

In the wireless communication device, the wireless communication device and the wireless receiving device communicate with each other by using a millimeter-wave frequency band.

Moreover, in the wireless communication device, the input formats include at least one of a video input format and an audio input format supported by the wireless receiving device.

Further, in the wireless communication device, the input formats are obtained only when communicating with the wireless receiving device for a first time, and the obtained input formats are stored in memory means of the wireless communication device.

Furthermore, in the wireless communication device, the reserved wireless resources include wireless resources required to wirelessly transmit the content data in the determined output format.

Moreover, in the wireless communication device, the reserved wireless resources further include wireless resources required to retransmit the content data.

Further, when there are a plurality of wireless receiving devices, the wireless communication device communicates with a predetermined wireless receiving device.

Furthermore, in the wireless communication device, the predetermined wireless receiving device is a wireless receiving device provided with video output means, or a wireless receiving device connected to a wired receiving device provided with video output means.

Moreover, in the wireless communication device, the predetermined wireless receiving device is a wireless receiving device provided with audio output means, or a wireless receiving device connected to a wired receiving device provided with audio output means.

Further, when there are a plurality of wireless receiving devices, the wireless communication device communicates with a wireless receiving device having the highest priority.

Furthermore, when there are a plurality of wireless receiving devices, the wireless communication device communicates with a wireless receiving device that outputs the content data to video output means having the highest priority.

Moreover, when there are a plurality of wireless receiving devices, the wireless communication device communicates with a wireless receiving device that outputs the content data to audio output means having the highest priority.

Further, when the wireless communication device detects a signal instructing playback of the content data, the wireless communication device transmits the origination port number to the wireless receiving device, and receives the destination port number transmitted from the wireless receiving device in response to the transmitted origination port number, thus exchanging the origination port number and the destination port number.

Furthermore, when the wireless communication device receives from the wireless receiving device a signal including the destination port number and instructing playback of the content data, the wireless communication device transmits the origination port number to the wireless receiving device in response to the received destination port number, thus exchanging the origination port number and the destination port number.

Moreover, the wireless communication device is connected by wire to at least one wired transmitting device that transmits the content data to the wireless communication device, and when receiving from the wired transmitting device a content data transmission start signal notifying start of transmission of the content data.

The wireless communication device transmits the origination port number to the wireless receiving device, and receives the destination port number transmitted from the wireless receiving device in response to the transmitted origination port number, thus exchanging the origination port number and the destination port number. Before wirelessly transmitting the content data to the wireless receiving device, the wireless communication device wirelessly transmits the content data transmission start signal to the wireless receiving device through the pair of ports indicated by the origination port number and the destination port number associated with each other.

Further, in the wireless communication device, the wired transmitting device is connected to the wireless communication device by using HDMI, and the content data transmission start signal is an Active Source message.

According to the second aspect of this invention, a wireless communication device that wirelessly receives content data from a wireless transmitting device is provided. The wireless communication device is provided with at least one port for wirelessly receiving the content data. The wireless communication device. determines a destination port number indicating a port for wirelessly receiving the content data. The wireless communication device, communicates with the wireless transmitting device to exchange an origination port number determined by the wireless transmitting device and the destination port number determined by the wireless communication device, the origination port number indicating a port for wirelessly transmitting the content data in the wireless transmitting device. The wireless communication device, associates the origination port number with the destination port number. The wireless communication device. notifies the wireless transmitting device of one or more input formats of the content data, supported by the wireless communication device. The wireless communication device. obtains from the wireless transmitting device one of the input formats that is determined by the wireless transmitting device as an output format of the content data. The wireless communication device. wirelessly receives the content data from the wireless transmitting device through a pair of ports indicated by the origination port number and the destination port number associated with each other.

In the wireless communication device, the wireless communication device and the wireless transmitting device communicate with each other by using a millimeter-wave frequency band.

Moreover, in the wireless communication device, the input formats include at least one of a video input format and an audio input format supported by the wireless communication device.

Further, when the wireless communication device detects a signal instructing playback of the content data, the wireless communication device transmits the destination port number to the wireless transmitting device, and receives the origination port number transmitted from the wireless transmitting device in response to the transmitted destination port number, thus exchanging the origination port number and the destination port number.

Furthermore, when the wireless communication device receives the origination port number from the wireless transmitting device, the wireless communication device transmits the destination port number to the wireless transmitting device in response to the received origination port number, thus exchanging the origination port number and the destination port number.

Moreover, the wireless communication device is connected by wire to at least one wired receiving device that receives the content data from the wireless communication device. When receiving from the wireless transmitting device a content data transmission start signal notifying start of transmission of the content data, the wireless communication device transmits the content data transmission start signal to any one of the wired receiving devices.

Further, in the wireless communication device, the wired receiving device is connected to the wireless communication device by using HDMI, and the content data transmission start signal is an Active Source message.

According to the third aspect of this invention, a wireless communication system is provided, in which the wireless communication device according to the first aspect of this invention operates as a wireless transmitting device, and the wireless communication device according to the second aspect of this invention operates as a wireless receiving device.

Effects of the Invention

According to the configuration of the present invention, even when there exist a wireless section between devices configuring an HDMI system, it is capable of one-touch playback of video and audio data. According to the wireless communication device and wireless communication system of the present invention, it is possible to automatically perform a connecting process between wireless communication devices, a format obtaining process, etc., for transmitting video and audio data between the wireless communication devices, thus improving user convenience.

BRIEF DESCRIPTION OF DRAWINGS

FIG. 5 is a diagram showing an exemplary device capability table in a device capability memory 24 of the wireless node device 20 of FIG. 1.

FIG. 19 is a diagram showing an exemplary connection information table in a connection information memory 25 of the wireless node device 20 of FIG. 1.

FIG. 20 is a diagram showing an exemplary connection information table in a connection information memory 15 of the wireless node device 10 of FIG. 1.

FIG. 29 is a diagram showing an exemplary device capability table in a device capability memory 124 of the wireless node device 120 of FIG. 22.

FIG. 30 is a diagram showing an exemplary connection information table in a connection information memory 125 of the wireless node device 120 of FIG. 22.

FIG. 31 is a diagram showing an exemplary connection information table in a connection information memory 135 of the wireless node device 130 of FIG. 22.

FIG. 32 is a diagram showing an exemplary connection information table in a connection information memory 115 of the wireless node device 110 of FIG. 22.

FIG. 33 is a diagram showing an exemplary connection information table in a connection information memory 175 of the wireless node device 170 of FIG. 22.

FIG. 34 is a diagram showing an exemplary device capability table in a device capability memory 124 of a wireless node device 120 in a wireless communication system according to a modification of the second embodiment of the present invention.

FIG. 37 is a diagram showing an exemplary connection information table in a connection information memory 115 of a wireless node device 110 in the wireless communication system according to the modification of the second embodiment of the present invention.

FIG. 38 is a diagram showing an exemplary connection information table in a connection information memory 175 of a wireless node device 170 in the wireless communication system according to the modification of the second embodiment of the present invention.

Figure 1:
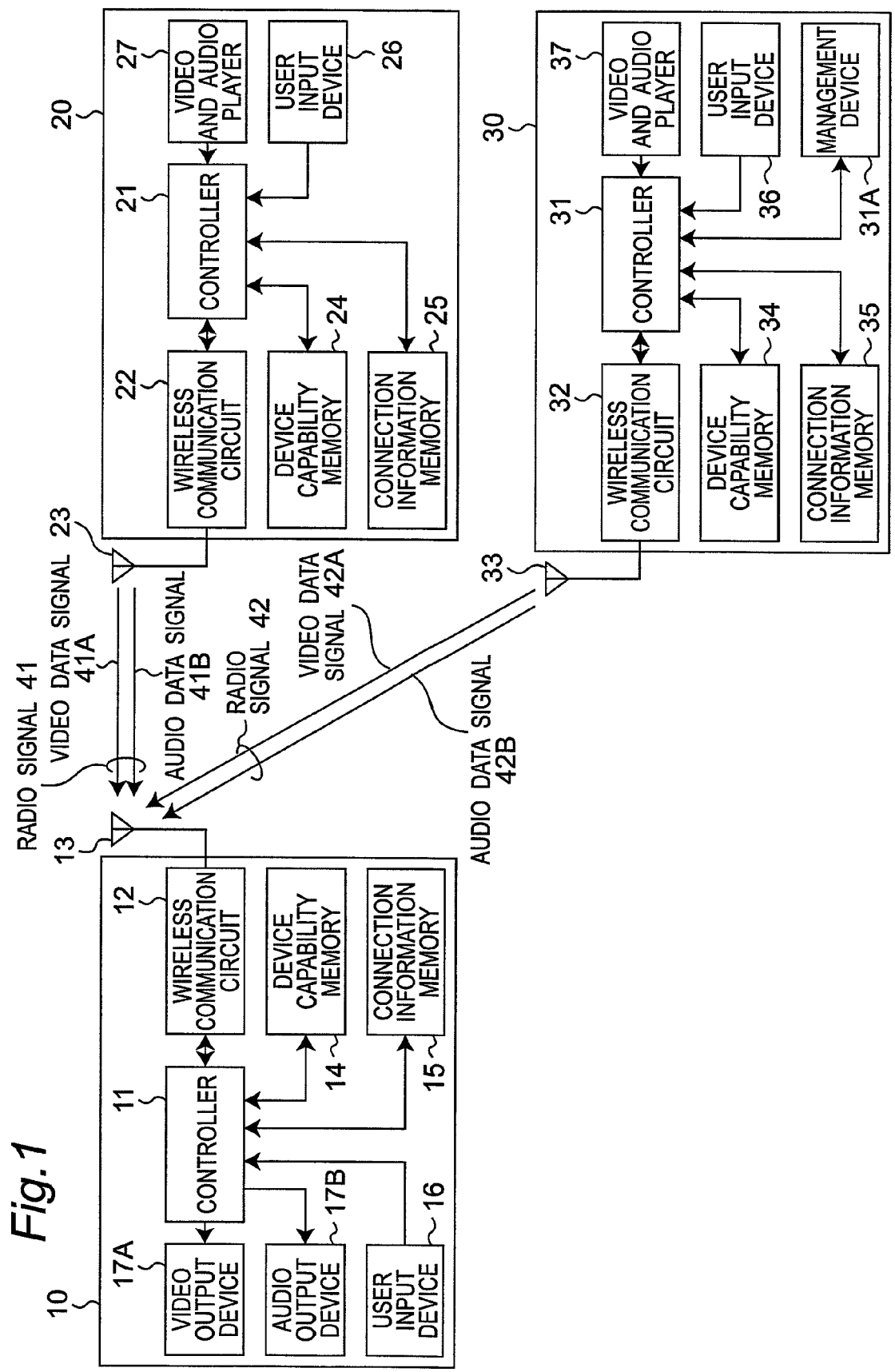
FIG. 1 is a block diagram showing a configuration of a wireless communication system according to a first embodiment of the present invention.

DESCRIPTION OF REFERENCE NUMERALS 10, 20, and 30: WIRELESS NODE DEVICE,
11, 21, and 31: CONTROLLER,
12, 22, and 32: WIRELESS COMMUNICATION CIRCUIT,
13, 23, and 33: ANTENNA,
14, 24, and 34: DEVICE CAPABILITY MEMORY,
15, 25, and 35: CONNECTION INFORMATION MEMORY,
16, 26, and 36: USER INPUT DEVICE,
17A: VIDEO OUTPUT DEVICE,
17B: AUDIO OUTPUT DEVICE,
27 and 37: VIDEO AND AUDIO PLAYER,
P 31A: MANAGEMENT DEVICE,
41, 42, 181, 182, and 183: RADIO SIGNAL,
41A, 42A, 181A, 181B, and 183A: VIDEO DATA SIGNAL,
41B, 42B, 182A, 182B, and 183B: AUDIO DATA SIGNAL,
50: DEVICE CAPABILITY REQUEST MESSAGE,
51, 61, 71, 81, and 91: OPERATION CODE FIELD,
52, 76, 87, and 98: RESERVED FIELD,
60: DEVICE CAPABILITY RESPONSE MESSAGE,
62 and 99: TOTAL DATA LENGTH FIELD,
63A, 63B, 100A, and 100B: TYPE FIELD,
64A, 64B, 101A, and 101B: DATA LENGTH FIELD,
65A, 65B, 102A, and 102B: DATA FIELD,
70 and 70A: CONNECT REQUEST MESSAGE,
72: PORT NUMBER FIELD,
73, 84, and 95: VP FIELD,
74, 85, and 96: AP FIELD,
75: S FIELD,
80 and 80A: CONNECT RESPONSE MESSAGE,
82 and 92: RESULT CODE FIELD,
83 and 94: DESTINATION PORT NUMBER FIELD,
86 and 97: SOURCE PORT NUMBER FIELD,
90: STREAM START NOTIFY MESSAGE,
93: STREAM ID FIELD,
110, 120, 130, and 170: WIRELESS NODE DEVICE,
111, 121, 131, 141, 151, 161, and 171: CONTROLLER,
112, 122, 132, and 172: WIRELESS COMMUNICATION CIRCUIT,
113, 123, 133, and 173: ANTENNA,
114, 124, 134, and 174: DEVICE CAPABILITY MEMORY,
115, 125, 135, and 175: CONNECTION INFORMATION MEMORY,
116, 126, 136, 146, 156, 166, and 176: USER INPUT DEVICE,
117 and 127: VIDEO AND AUDIO PROCESSING DEVICE,
118, 128, 148, 158, and 168: WIRED COMMUNICATION CIRCUIT,
137 and 157: VIDEO AND AUDIO PLAYER,
131A: MANAGEMENT DEVICE,
147A, 167A, and 177A: VIDEO OUTPUT DEVICE,
147B, 167B, and 177B: AUDIO OUTPUT DEVICE,
140, 150, and 160: WIRED NODE DEVICE,
181, 182, and 183: RADIO SIGNAL,
181A, 182A, and 183A: VIDEO DATA SIGNAL,
181B, 182B, and 183B: AUDIO DATA SIGNAL, and
184, 185, and 186: HDMI CABLE.

BEST MODE FOR CARRYING OUT THE INVENTION

The best mode for carrying out the present invention will be described below with reference to the drawings.

First Preferred Embodiment

FIG. 1 is a block diagram showing an exemplary configuration of a wireless communication system according to a first embodiment of the present invention. In FIG. 1, each of wireless node devices 10, 20, and 30 is an AV equipment provided with a wireless interface, and communicating content data, such as video and audio (AV) data, through a wireless section. In this case, the wireless node device 20 transmits a radio signal 41 including a video data signal 41A and an audio data signal 41B to the wireless node device 10, and the wireless node device 30 transmits a radio signal 42 including a video data signal 42A and an audio data signal 42B to the wireless node device 10. The transmissions of the respective radio signals 41 and 42 may be multiplexed by using the frequency-division multiplexing in different radio frequency bands, or may be multiplexed by using the time-division multiplexing in different times. Hereinafter, a device that transmits video and audio data is referred to as a Source device, and a device that receives the video and audio data is referred to as a Sink device.

The wireless node device 10 operates as a Sink device in the wireless communication system of FIG. 1. The wireless node device 10 is provided with: a wireless communication circuit 12 connected to an antenna 13 and serving as a wireless interface for processes such as transmission and reception and modulation and demodulation of radio signals; a video output device 17A such as a display; an audio output device 17B such as speakers; and a controller 11 controlling these components. The controller 11 are further connected with: a device capability memory 14 for storing information on each wireless node device in the wireless communication system; a connection information memory 15 for storing connection information for establishing connections among wireless node devices; and a user input device 16 for obtaining user inputs. The controller 11 performs: medium access control for reserving radio frequency band or time resources, and transmitting and receiving video and audio data within the reserved radio frequency bands or times; resource management of a radio frequency bands or times for transmitting video and audio data; port control including, e.g., determination and association of ports used during wireless communication (i.e., an origination port of a wireless node device operating as a Source device, and a destination port of the wireless node device 10 operating as a Sink device); connection management for configuring connections with the other wireless node devices; and application control including processes of the upper layer for processing user inputs, etc. The wireless communication circuit 12 has a high-speed data reception function of receiving data at a high transmission rate, and a low-speed data transmission and reception function of transmitting and receiving data at a low transmission rate. In this case, data to be transmitted by using high-speed data transmission and reception function includes data requiring high-speed transmission and reception, such as non-compressed videos, and data that can be transmitted at a relatively low transmission rate, such as audios and control commands. Data to be transmitted by using the low-speed data transmission and reception function includes data that can be transmitted at a relatively low transmission rate, such as audios and control commands. The user input device 16 receives instruction signals inputted from operation buttons (not shown) or transmitted from a remote control (not shown) by a user to instruct, e.g., to play back and stop video and audio data, and passes the instruction signals to the controller 11. The video output device 17A and the audio output device 17B respectively output video and audio data which are wirelessly transmitted from the wireless node devices 20 and 30.

The wireless node device 20 operates as a Source device in the wireless communication system of FIG. 1. The wireless node device 20 is provided with: a wireless communication circuit 22 connected to an antenna 23 and serving as a wireless interface; a video and audio player 27 such as a DVD player and a set-top box (STB: e.g., a tuner); and a controller 21 controlling these components. The controller 21 are further connected with: a device capability memory 24 for storing information on each wireless node device in the wireless communication system; a connection information memory 25 for storing connection information for establishing connections among wireless node devices; and a user input device 26 for obtaining user inputs. In a manner similar to that of the controller 11 of the wireless node device 10, the controller 21 performs the medium access control, resource management, port control, connection management, and application control. The wireless communication circuit 22 has a high-speed data transmission function of transmitting data at a high transmission rate, and a low-speed data transmission and reception function of transmitting and receiving data at a low transmission rate. The video and audio player 27 reads data from recording media, such as a DVD, or processes a broadcast signal broadcasted from a remote transmitter station, thus obtaining video and audio data.

The wireless node device 30 operates as another Source device in the wireless communication system of FIG. 1. The wireless node device 30 is provided with: a wireless communication circuit 32 connected to an antenna 33 and serving as a wireless interface; a video and audio player 37 such as a DVD player and an STB; a management device 31A managing information on wireless resources in the wireless communication system (radio frequency bands or times); and a controller 31 controlling these components. The controller 31 are further connected with: a device capability memory 34, a connection information memory 35, and a user input device 36. In a manner similar to that of the controller 11 of the wireless node device 10, the controller 31 performs the medium access control, resource management, port control, connection management, and application control. Further, the wireless communication circuit 32, the device capability memory 34, the connection information memory 35, the user input device 36, and the video and audio player 37 are configured in a manner similar to that of the corresponding components of the wireless node device 20.

The wireless communication circuits 12, 22, and 32 include a radio-frequency circuit, a baseband processing circuit, etc., and may use arbitrary wireless transmission scheme, and thus, the explanation is omitted in the present embodiment. For example, for high-speed data transmission, it is possible to use a wireless transmission scheme using a radio wave of the millimeter-wave band. Further, in the wireless communication system of FIG. 1, since the wireless node devices 20 and 30 have the high-speed data transmission function and the wireless node device 10 has the high-speed data reception function, it is possible to accomplish high-speed data transmission from the wireless node device 20 to the wireless node device 10, and high-speed data transmission from the wireless node device 30 to the wireless node device 10.

The wireless communication circuit 12 of the wireless node device 10 operating as a Sink device has one or more ports assigned to receive video and audio data, and each of the wireless communication circuits 22 and 32 of the wireless node devices 20 and 30 operating as Source devices has one or more ports assigned to transmit video and audio data. The number of ports is determined by the hardware configuration of the wireless communication circuits 12, 22, and 32. By performing a connecting process described below, one port of a wireless communication circuit of a wireless node device operating as a Source device (hereinafter, referred to as a "origination port") is associated with one port of a wireless communication circuit of a wireless node device operating as a Sink device (hereinafter, referred to as a "destination port"). The pair of ports associated with each other is further associated with a radio frequency band or time which is reserved by performing a resource reserving process described below. Whenever wirelessly transmitting video data and audio data in the wireless communication system, a pair of an origination port and a destination port is determined as described in detail below. Further, the wireless node device 20 associates its ports with the video and audio player 27, the wireless node device 30 associates its ports with the video and audio player 37, and the wireless node device 10 associates its ports with the video output device 17A and the audio output device 17B. Hence, video and audio data signals played back by the video and audio player 27 of the wireless node device 20 are transmitted through an origination port of the wireless node device 20 and a destination port of the wireless node device 10, to the video output device 17A and the audio output device 17B of the wireless node device 10. The same also applies to the case of transmitting video and audio data signals from the wireless node device 30 to the wireless node device 10.

Figure 2:
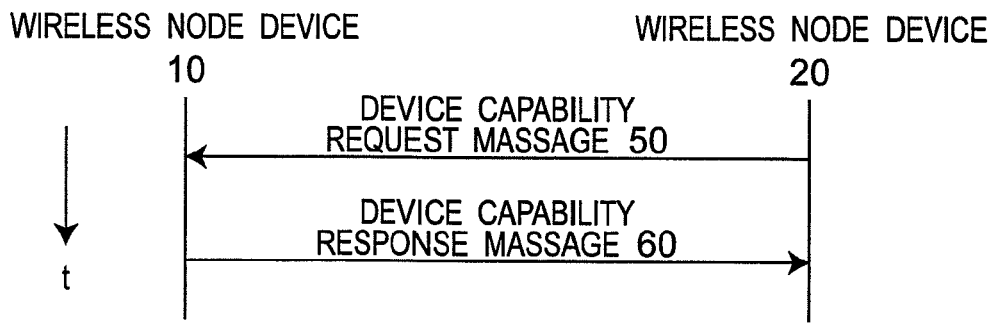
FIG. 2 is a sequence diagram showing a device capability obtaining process which is performed between wireless node devices 10 and 20 of FIG. 1.
Figure 3:
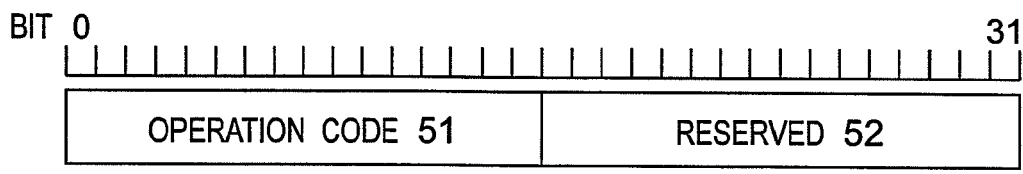
FIG. 3 is a diagram showing an exemplary format of a device capability request message 50 of FIG. 2.
Figure 4:
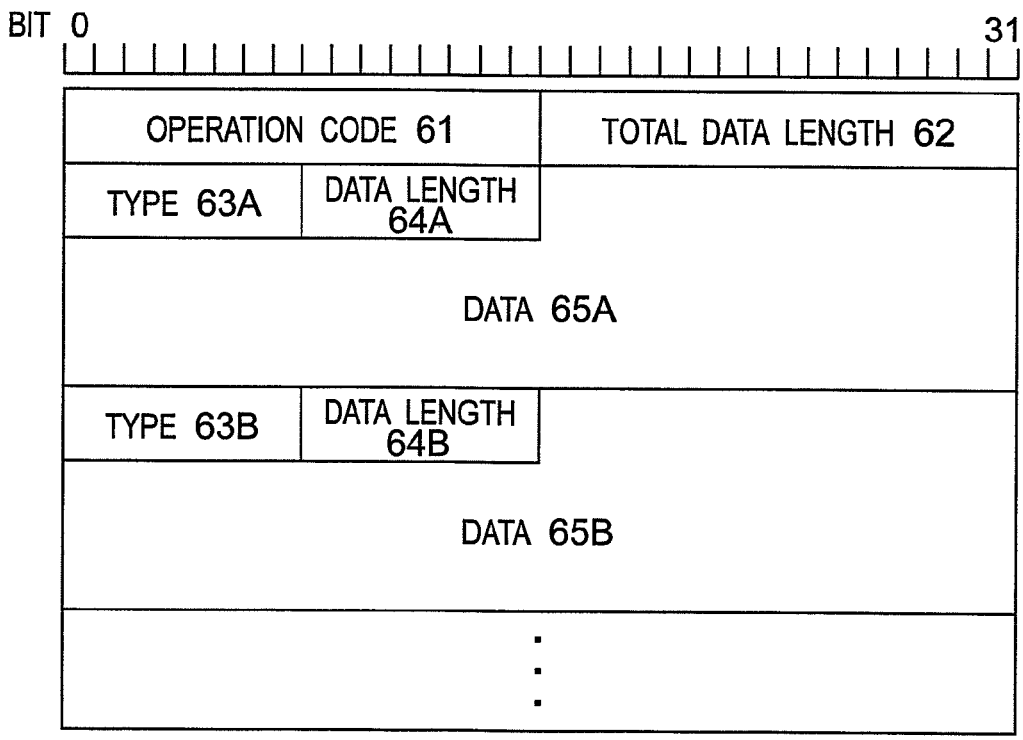
FIG. 4 is a diagram showing an exemplary format of a device capability response message 60 of FIG. 2.

With reference to FIGS. 2 to 5, a device capability obtaining process is described, which is performed to obtain and share information on each wireless node device in the wireless communication system. FIG. 2 is a sequence diagram showing a device capability obtaining process which is performed between the wireless node devices 10 and 20 of FIG. 1. FIG. 3 is a diagram showing an exemplary format of a device capability request message 50 of FIG. 2. FIG. 4 is a diagram showing an exemplary format of a device capability response message 60 of FIG. 2. When a wireless node device newly participates in the wireless communication system, a device capability obtaining process is performed by requesting for device capability information on the other wireless node devices in the wireless communication system, as part of an initialization process of an application running on the wireless node device. Prior to performing the device capability obtaining process, each of the wireless node devices 10, 20, and 30 recognizes MAC addresses and device IDs (device identifiers: i.e., identifiers assigned to identify each wireless node device in the wireless communication system) of all wireless node devices in the wireless communication system, through the medium access control by each of the controllers 11, 21, and 31. These MAC address and device ID are inserted into a message header (MAC header) when transmitting each message exemplified in this specification. Referring to FIG. 2, a wireless node device which performs the device capability obtaining process, e.g., the wireless node device 20, transmits a device capability request message 50 to another wireless node device in the wireless communication system, e.g., the wireless node device 10. In response to this message, the wireless node device 10 transmits a device capability response message 60 to the wireless node device 20, including device capability information on the wireless node device 10.

The device capability request message 50 includes an operation code field 51 and a reserved field 52, as shown in FIG. 3. Further, a header (not shown) of the device capability request message 50 includes respective device IDs of the origination wireless node device 20 and the destination wireless node device 10. The operation code field 51 is a field containing a code indicating that the message is the device capability request message 50. The reserved field 52 is a field reserved for future expansion.

Then, the device capability response message 60 includes an operation code field 61, a total data length field 62, type fields 63A, 63B, . . . , data length fields 64A, 64B, . . . , and data fields 65A, 65B, . . . , as shown in FIG. 4. Further, a header (not shown) of the device capability response message 60 includes respective device IDs of the destination wireless node device 10 and origination wireless node device 20. The operation code field 61 is a field containing a code indicating that the message is the device capability response message 60. The total data length field 62 is a field containing the data length of the device capability response message 60. Each of the type fields 63A, 63B, . . . is a field containing a value indicating the type of device capability information included in its corresponding data field 65A, 65B, . . . . Each of the data length fields 64A, 64B, . . . is a field containing the data length of its corresponding data field 65A, 65B, . . . . Each of the data fields 65A, 65B, . . . is a field containing data on a device capability. Each of the data fields 65A, 65B, . . . includes, as device capability information, the type of a wireless node device which is an origination of the device capability response message 60 (i.e., the wireless node device 10), capabilities of high-speed transmission and reception, and a device name set by the user, and if necessary, further includes the model number, serial number, and MAC address of the wireless node device. Details of the device capability information will be described below with reference to FIG. 5. Further, the respective pieces of the device capability information may be included in one message, or may be included in a plurality of different messages. In the case that individual pieces of the device capability information are transmitted by different messages, a plurality of device capability response messages 60 may be transmitted in response to one device capability request message 50. In this case, each device capability response message 60 may include a sequence number for identifying a series of messages, and a flag indicating whether or not the message is the last device capability response message 60. Further, a device capability request message 50 may include a field containing a value indicating the type of device capability information to be requested, and a device capability response message 60 may only include device capability information on the requested type which is included in the device capability request message 50.

After receiving a device capability response message 60, the wireless node device 20 stores the information on the wireless node device 10 included in the device capability response message 60, into the device capability memory 24.

In a manner similar to that of the above-described device capability obtaining process by the wireless node device 20, the wireless node device 10 obtains device capability information on the wireless node device 20, and the wireless node devices 10 and 30 exchange device capability information with each other, and the wireless node devices 20 and 30 exchange device capability information with each other.

A wireless node device provided with a video output device (e.g., the wireless node device 10) displays on the video output device the device capability information obtained by device capability response messages 60, so that the user can recognize what wireless node devices exist in the wireless communication system.

When a wireless node device has newly participated in the wireless communication system, the newly participated wireless node device itself may notify all the other wireless node devices in the wireless communication system, of its device capability information. Alternatively, a management device (e.g., the management device 31A of the wireless node device 30) may be provided in the wireless communication system, and each wireless node device may notify the management device of its device capability information. The management device periodically transmits a beacon signal indicating the presence of the management device, to the respective wireless node devices in the wireless communication system. In this case, each wireless node device can obtain device capability information on the other wireless node devices in the wireless communication system, from the management device. In this case, each wireless node device transmits a device capability request message 50 to the management device, and the management device transmits a device capability response message 60 including device capability information on the other wireless node devices, to the origination wireless node device of the device capability request message 50. Further, when a wireless node device newly participates in the wireless communication system, the management device can transmit a message indicating that one wireless node device has newly participated in the wireless communication system, to the other wireless node devices in the wireless communication system. In this case, the wireless node devices that have received the message transmit a device capability request message 50 to the newly participated wireless node device or to the management device, and thus, obtain device capability information on the newly participated wireless node device.

FIG. 5 is a diagram showing an exemplary device capability table in the device capability memory 24 of the wireless node device 20 of FIG. 1. A device ID field is a field containing a device ID of each of the wireless node devices 10, 20, and 30. In the present embodiment, the device ID of the wireless node device 10 is "0", the device ID of the wireless node device 20 is "1", and the device ID of the wireless node device 30 is "2". In the example of FIG. 5, for ease of explanation, the device capability memory 24 of the wireless node device 20 also stores device capability information on the wireless node device 20 itself. A device type field is a field containing an identifier indicating the type of each of the wireless node devices 10, 20, and 30; for example, the types of wireless node device include a TV, a DVD player, a DVD recorder, an STB, etc. A high-speed transmission capability field is a field containing a value indicating whether or not each of the wireless node devices 10, 20, and 30 has the high-speed data transmission function. A high-speed reception capability field is a field containing a value indicating whether or not each of the wireless node devices 10, 20, and 30 has the high-speed data reception function. A wireless node device having the high-speed data transmission function is operable as a Source device, and a wireless node device having the high-speed reception function is operable as a Sink device. A MAC address field is a field containing a MAC address of each of the wireless node devices 10, 20, and 30. A device name field is a field containing the model number of each of the wireless node devices 10, 20, and 30, a name set by the user, or the like. The device capability memory 24 may further include data such as a serial number. An input format field is a field provided only for a wireless node device operating as a Sink device (in the present embodiment, a wireless node device provided with at least one of a video output device and an audio output device), and the field contains information on input formats of video and audio data supported by that wireless node device, which is obtained from an EDID-ROM (Extended Display Identification Data ROM) of the wireless node device. The input format field is initially blank, and then, stores data by performing an input format obtaining process described below. Data of the device ID field, the device type field, the high-speed transmission capability field, the high-speed reception capability field, the MAC address field, and the device name field is shared among all of the wireless node devices 10, 20, and 30. On the other hand, data of the input format field is not stored in the device capability memory 14 of the wireless node device 10 operating as a Sink device, but stored only in the device capability memories 24 and 34 of the wireless node devices 20 and 30 operating as Source devices. Note that although a device ID and a MAC address are different data units in the example of FIG. 5, a MAC address may be used as a device ID.

With reference to FIGS. 6 to 21, a wireless communicating process according to the present embodiment will be described below.

Figure 6:
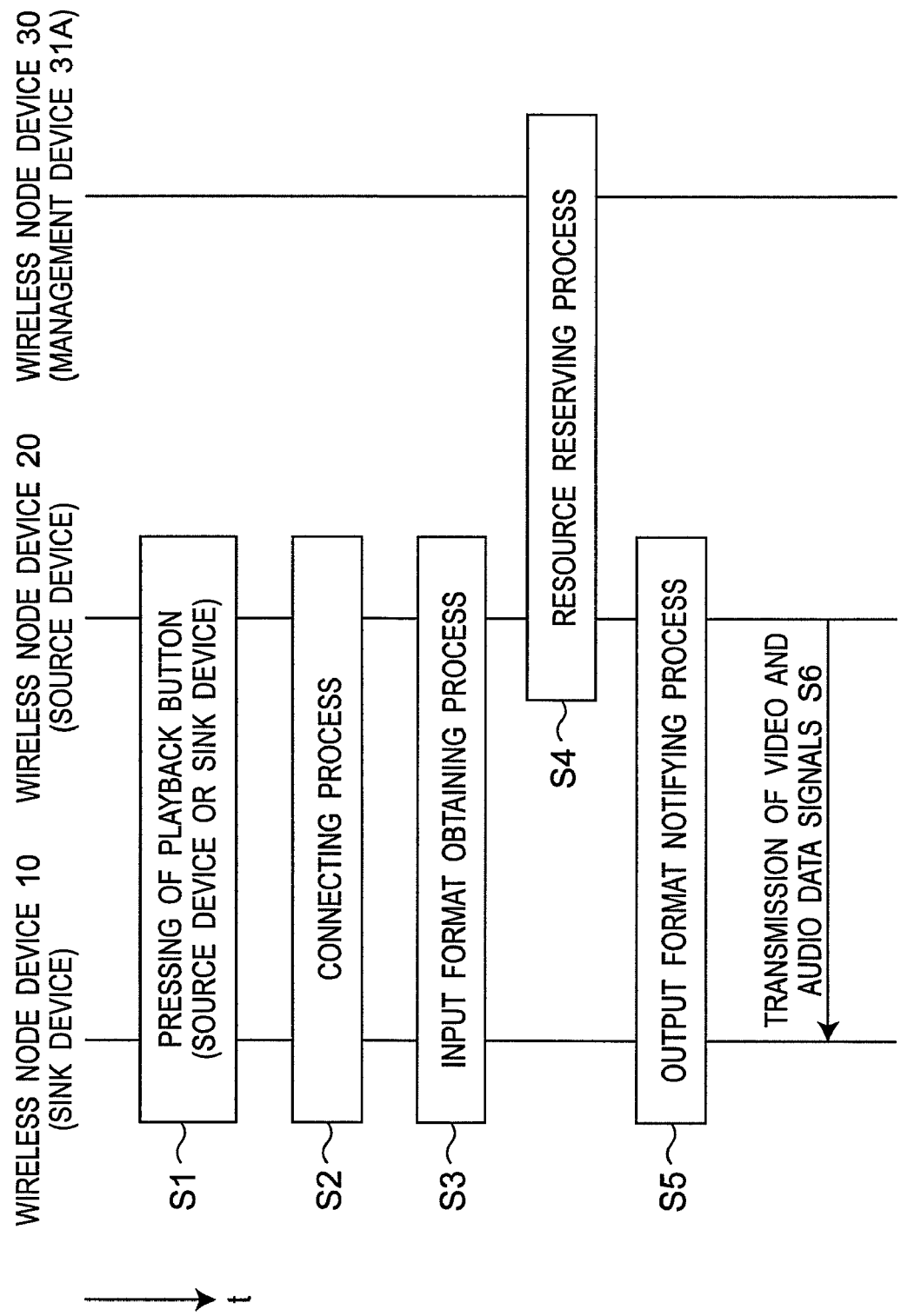
FIG. 6 is a sequence diagram showing a wireless communicating process which is performed by the wireless communication system of FIG. 1 when a playback button is pressed on the wireless node device 10 or 20 of FIG. 1.

FIG. 6 is a sequence diagram showing a wireless communicating process which is performed by the wireless communication system of FIG. 1 when a playback button is pressed on the wireless node device 10 or 20 of FIG. 1. The wireless communicating process of FIG. 6 is performed when a playback button is pressed on the user input device 26 of the wireless node device 20 operating as a Source device, or on the user input device 16 of the wireless node device 10 operating as a Sink device (step S1). When the playback button is pressed, then in step S2, the wireless node devices 10 and 20 perform a connecting process for determining a pair of an origination port number and a destination port number for transmission of video and audio data signals. After completion of the connecting process, then in step S3, an input format obtaining process is performed in which the wireless node device 20 operating as a Source device obtains information on supported input formats from the wireless node device 10 operating as a Sink device. After completion of the input format obtaining process, then in step S4, the wireless node device 20 operating as a Source device performs a resource reserving process for reserving radio frequency bands or times for transmission of video and audio data signals, in cooperation with the management device 31A in the wireless node device 30. After completion of the resource reserving process, then in step S5, an output format notifying process is performed in which the wireless node device 20 operating as a Source device notifies the wireless node device 10 operating as a Sink device, of an output format of video and audio data signals. After completion of steps S2 to S5, then in step S6, the wireless node device 20 transmits video and audio data signals to the wireless node device 10.

Figure 7:
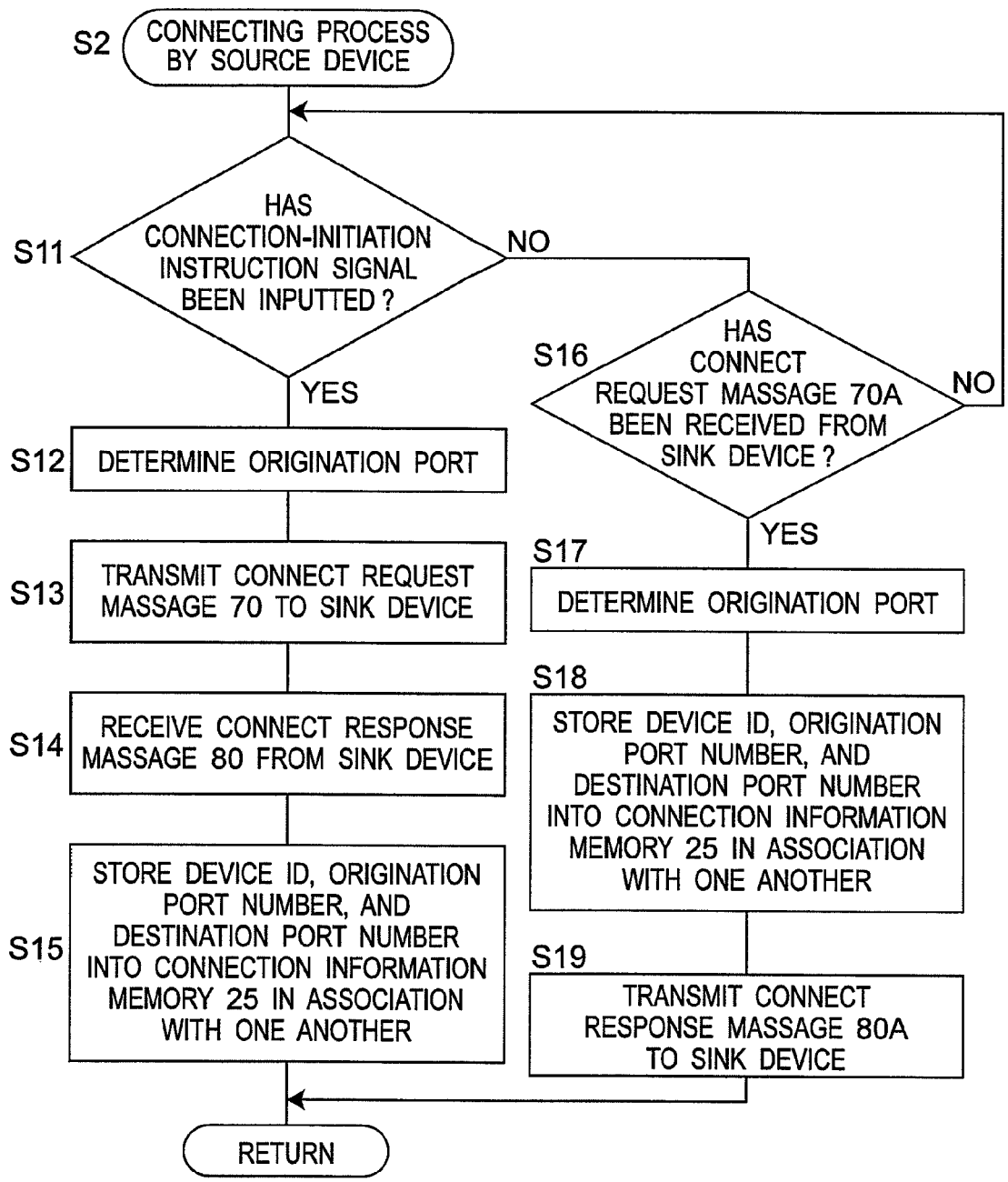
FIG. 7 is a flowchart showing a subroutine of connecting process step S2 of FIG. 6, that is, a subroutine of connecting process step S2 by a Source device which is performed by the wireless node device 20 of FIG. 1.
Figure 11:
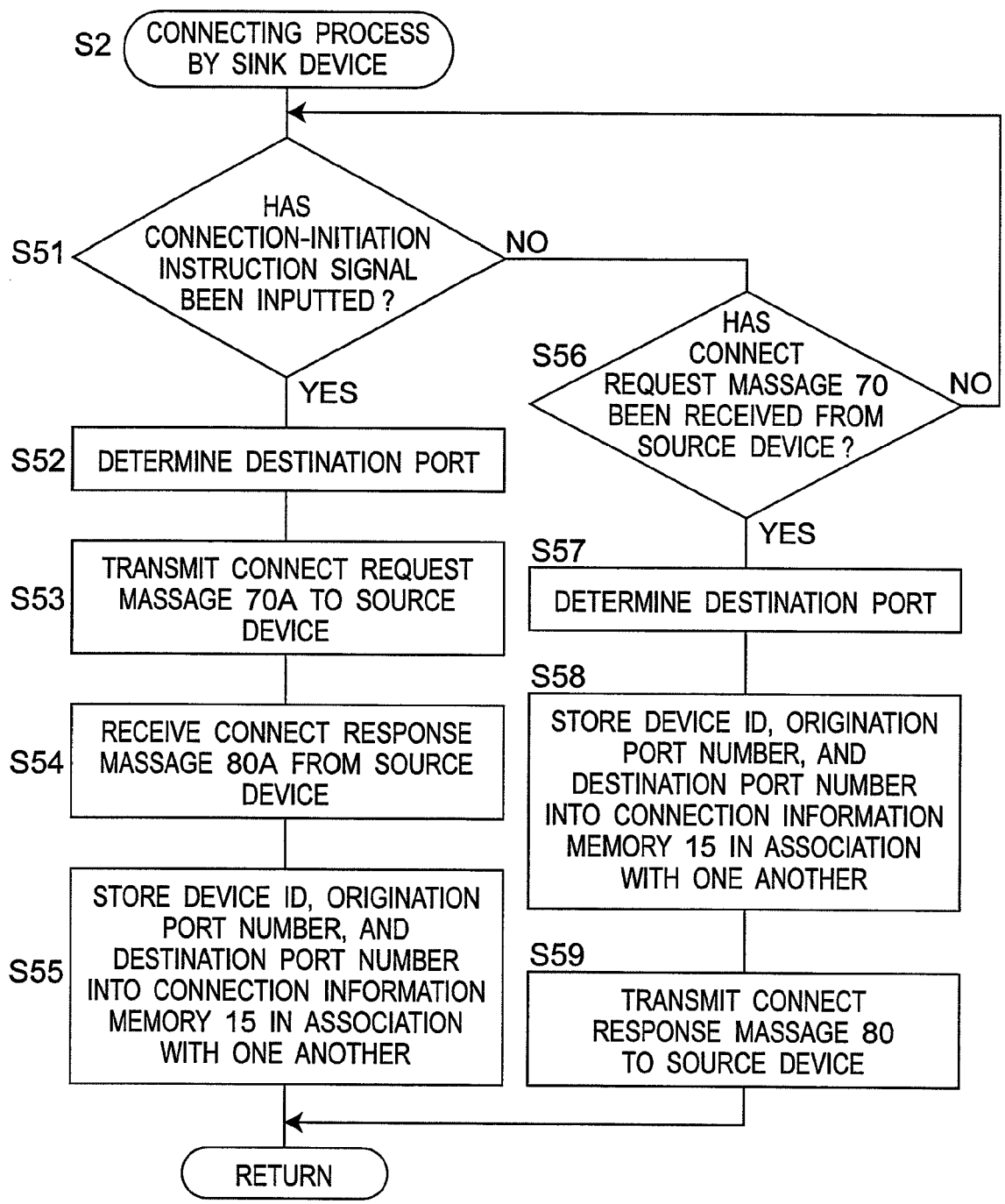
FIG. 11 is a flowchart showing a subroutine of connecting process step S2 of FIG. 6, that is, a subroutine of connecting process step S2 by a Sink device which is performed by the wireless node device 10 of FIG. 1.
Figure 15:
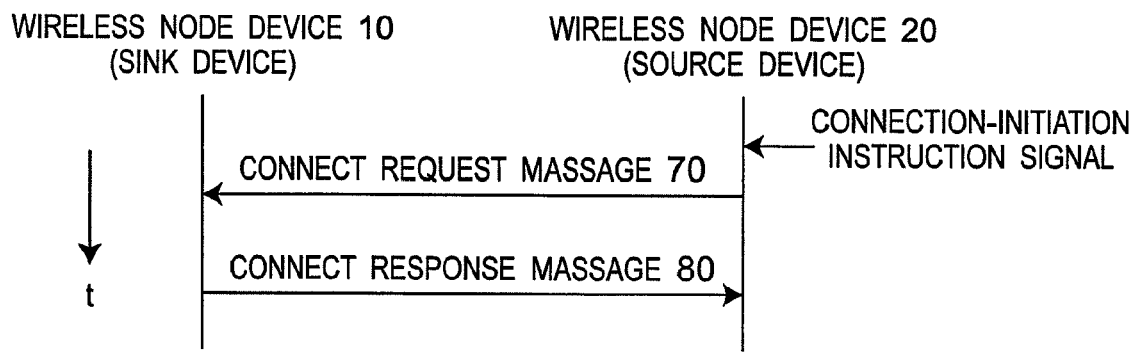
FIG. 15 is a sequence diagram showing connecting process step S2 which is performed between the wireless node devices 10 and 20 of FIG. 1 when the playback button is pressed on the wireless node device 20 of FIG. 1.
Figure 16:
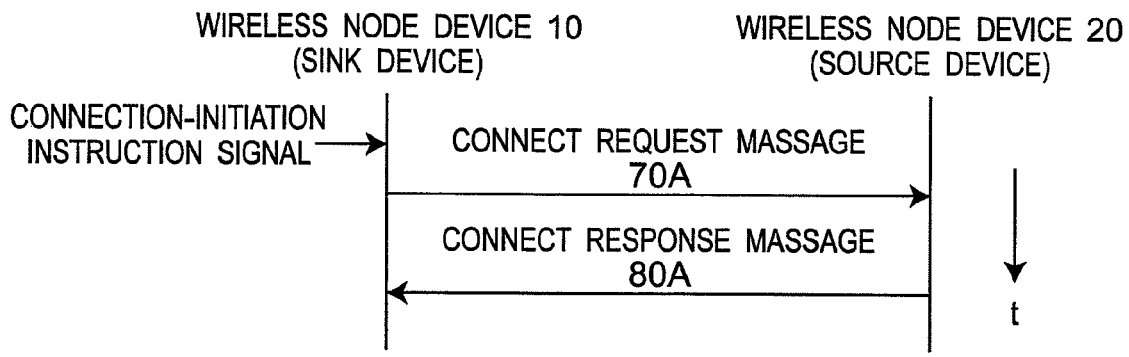
FIG. 16 is a sequence diagram showing connecting process step S2 which is performed between the wireless node devices 10 and 20 of FIG. 1 when the playback button is pressed on the wireless node device 10 of FIG. 1.

Each of FIGS. 7 and 11 shows a subroutine of the connecting process step S2 of FIG. 6. FIG. 7 is a flowchart showing a subroutine of the connecting process step S2 by a Source device which is performed by the wireless node device 20 of FIG. 1, and FIG. 11 is a flowchart showing a subroutine of the connecting process step S2 by a Sink device which is performed by the wireless node device 10 of FIG. 1. The operation of the connecting process step S2 for the case in which the playback button is pressed on the wireless node device 20 as a Source device is different from that for the case in which the playback button is pressed on the wireless node device 10 as a Sink device. Now, this difference will be roughly described with reference to FIGS. 15 and 16. FIG. 15 is a sequence diagram showing the connecting process step S2 which is performed between the wireless node devices 10 and 20 of FIG. 1 when the playback button is pressed on the wireless node device 20 of FIG. 1, and FIG. 16 is a sequence diagram showing the connecting process step S2 which is performed between the wireless node devices 10 and 20 of FIG. 1 when the playback button is pressed on the wireless node device 10 of FIG. 1. FIG. 15 shows the case in which the wireless node device 20 operating as a Source device initiates a connecting process to the wireless node device 10 operating as a Sink device. When the wireless node device 20 detects a connection-initiation instruction signal generated by pressing the playback button on the user input device 26, the wireless node device 20 transmits a connect request message 70 to the wireless node device 10, including an origination port number. When the wireless node device 10 receives the connect request message 70, the wireless node device 10 transmits a connect response message 80 to the wireless node device 20, including a destination port number. On the other hand, FIG. 16 shows the case in which the wireless node device 10 operating as a Sink device initiates a connecting process to the wireless node device 20 operating as a Source device. When the wireless node device 10 detects a connection-initiation instruction signal generated by pressing the playback button on the user input device 16, the wireless node device 10 transmits a connect request message 70A to the wireless node device 20, including a destination port number. When the wireless node device 20 receives the connect request message 70A, the wireless node device 20 transmits a connect response message 80A to the wireless node device 10, including an origination port number.

Figure 17:
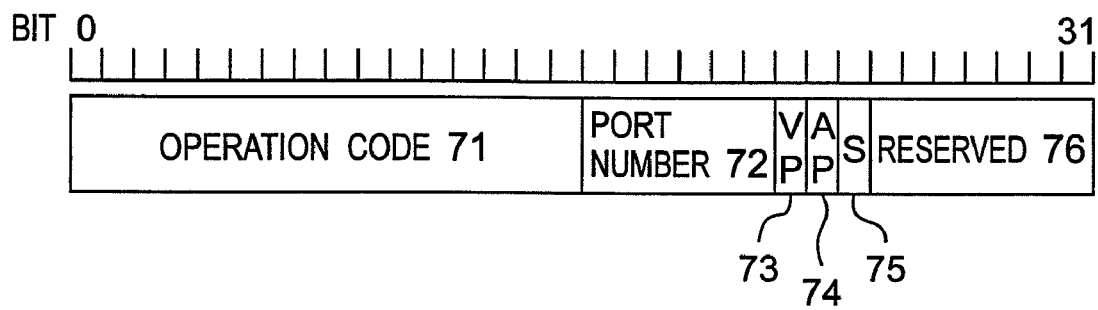
FIG. 17 is a diagram showing an exemplary format of a connect request message 70 of FIG. 15 and a connect request message 70A of FIG. 16.

FIG. 17 is a diagram showing an exemplary format of the connect request message 70 of FIG. 15 and the connect request message 70A of FIG. 16. Each of the connect request messages 70 and 70A includes an operation code field 71, a port number field 72, a VP field 73, an AP field 74, an S field 75, and a reserved field 76. Further, each header (not shown) of the connect request messages 70 and 70A includes respective device IDs of the origination and destination wireless node devices 10 and 20. The operation code field 71 is a field containing a code indicating that the message is the connect request message 70 or 70A. In the case of the connect request message 70 transmitted from the wireless node device 20 operating as a Source device, the port number field 72 stores an origination port number which is an origination of data; on the other hand, in the case of the connect request message 70A transmitted from the wireless node device 10 operating as a Sink device, the port number field 72 is a field containing a destination port number which is a destination of data. The VP field 73 is a field containing a flag indicating whether or not video data is to be transmitted through the port specified in the port number field 72. The AP field 74 is a field containing a flag indicating whether or not audio data is to be transmitted through the port specified in the port number field 72. The S field 75 is a field indicating whether the origination of the connect request message is a Source device or a Sink device. The reserved field 76 is a field reserved for future expansion. If S field 75 is set to 0, the connect request message is one transmitted from a Source device (i.e., the connect request message 70 of FIG. 15), and a port number contained in the port number field 72 indicates an origination port of the Source device. On the other hand, if the S field 75 is set to 1, the connect request message is one transmitted from a Sink device (i.e., the connect request message 70A of FIG. 16), and a port number contained in the port number field 72 indicates a destination port of the Sink device.

Figure 18:
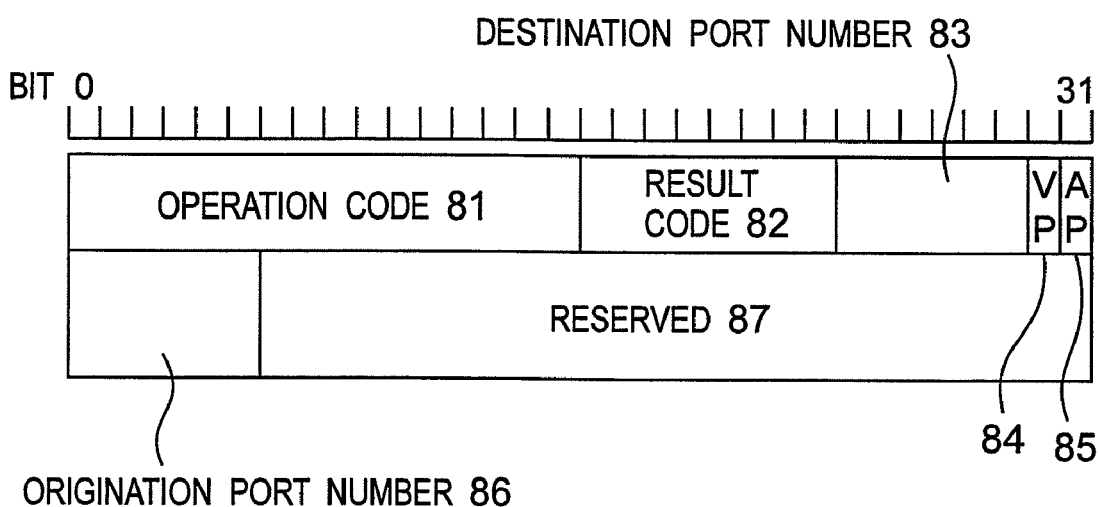
FIG. 18 is a diagram showing an exemplary format of a connect response message 80 of FIG. 15 and a connect response message 80A of FIG. 16.

FIG. 18 is a diagram showing an exemplary format of the connect response message 80 of FIG. 15 and the connect response message 80A of FIG. 16. Each of the connect response messages 80 and 80A includes an operation code field 81, a result code field 82, a destination port number field 83, a VP field 84, an AP field 85, an origination port number field 86, and a reserved field 87. Further, each header (not shown) of the connect response messages 80 and 80A includes respective device IDs of the origination and destination wireless node devices 10 and 20. The operation code field 81 is a field containing a code indicating that the message is the connect response message 80 or 80A. The result code field 82 is a field containing a code indicating a result of a connect request. The destination port number field 83 is a field containing a destination port number. The VP field 84 is a field containing a flag indicating whether or not video data is to be transmitted through the port. The AP field 85 is a field containing a flag indicating whether or not audio data is to be transmitted through the port. The origination port number field 86 is a field containing an origination port number. The reserved field 87 is a field reserved for future expansion. The VP field 84 is set to the same value as a flag value set in the VP field 73 of the received connect request message 70 or 70A. The AP field 85 is set to the same value as a flag value set in the AP field 74 of the received connect request message 70 or 70A. Further, if the S field of the received connect request message 75 is set to 0, a connect response message is one to be transmitted from a Sink device to a Source device (i.e., the connect response message 80 of FIG. 15). Then, the destination port number field 83 is set with a destination port number determined by the Sink device itself, and the origination port number field 86 is set with a value copied from the port number field 72 of the received connect request message. On the other hand, if the S field 75 of the received connect request message is set to 1, a connect response message is one to be transmitted from a Source device to a Sink device (i.e., the connect response message 80A of FIG. 16). Then, the destination port number field 83 is set with a value copied from the port number field 72 of the received connect request message, and the origination port number field 86 is set with an origination port number determined by the Source device itself.

With reference to FIG. 7, the connecting process step S2 by a Source device which is performed by the wireless node device 20 of FIG. 1 will be described in detail. In step S11 of FIG. 7, the controller 21 of the wireless node device 20 determines whether or not a connection-initiation instruction signal has been generated and inputted due to the playback button being pressed on the user input device 26. If YES, then the process goes to step S12; and if NO, then the process goes to step S16. In step S16, the controller 21 determines whether or not a connect request message 70A has been received from the wireless node device 10 due to the playback button being pressed on the user input device 16 of the wireless node device 10 operating as a Sink device. If YES, then the process goes to step S17; and if NO, then the process returns to step S11 to wait for a connection-initiation instruction signal or connect request message 70A. Steps S12 to S15 correspond to the sequence diagram of FIG. 15, and steps S17 to S19 correspond to the sequence diagram of FIG. 16. In step S12, the controller 21 determines an origination port used to transmit video and audio data signals. In step S13, the wireless node device 20 operating as a Source device transmits a connect request message 70 to the wireless node device 10 operating as a Sink device, including the origination port number determined in step S12. In step S14, the wireless node device 20 operating as a Source device receives a connect response message 80 from the wireless node device 10 operating as a Sink device, including a destination port number determined by the wireless node device 10 operating as a Sink device. In step S15, the controller 21 stores a device ID of the wireless node device 10 operating as a Sink device, the origination port number determined in step S12, and the destination port number included in the connect response message 80 received in step S14, into the connection information memory 25 in association with one another, and goes to step S3. On the other hand, if a connect request message 70A is received from the wireless node device 10 (if YES in step S16), then in step S17, the controller 21 determines an origination port used to transmit video and audio data signals. In step S18, the controller 21 stores a device ID of the wireless node device 10 operating as a Sink device, the origination port number determined in step S17, and a destination port number included in the connect request message 70A received in step S16, into the connection information memory 25 in association with one another. In step S19, the wireless node device 20 operating as a Source device transmits a connect response message 80A to the wireless node device 10 operating as a Sink device, including the origination port number determined in step S17, and goes to step S3.

FIG. 19 is a diagram showing an exemplary connection information table in the connection information memory 25 of the wireless node device 20 of FIG. 1. A device ID of Sink device field is a field containing a device ID of the wireless node device 10 operating as a Sink device to be connected. A origination port number field is a field containing an origination port number of the wireless node device 20 itself. A destination port number field is a field containing a destination port number of the wireless node device 10 operating as a Sink device. A stream ID field is a field containing a stream ID which is assigned upon the resource reserving process described below.

With reference to FIG. 11, the connecting process step S2 by a Sink device which is performed by the wireless node device 10 of FIG. 1 will be described in detail. In step S51 of FIG. 11, the controller 11 of the wireless node device 10 determines whether or not a connection-initiation instruction signal has been generated and inputted due to the playback button being pressed on the user input device 16. If YES, then the process goes to step S52; and if NO, then the process goes to step S56. In step S56, the controller 11 determines whether or not a connect request message 70 has been received from the wireless node device 20 due to the playback button being pressed on the user input device 26 of the wireless node device 20 operating as a Source device. If YES, then the process goes to step S57; and if NO, then the process returns to step S51 to wait for a connection-initiation instruction signal or connect request message 70. Steps S52 to S55 correspond to the sequence diagram of FIG. 16, and steps S57 to S59 correspond to the sequence diagram of FIG. 15. In step S52, the controller 11 determines a destination port used to receive video and audio data signals. In step S53, the wireless node device 10 operating as a Sink device transmits a connect request message 70A to the wireless node device 20 operating as a Source device, including the destination port number determined in step S52. In step S54, the wireless node device 10 operating as a Sink device receives a connect response message 80A from the wireless node device 20 operating as a Source device, including an origination port number determined by the wireless node device 20 operating as a Source device. In step S55, the controller 11 stores a device ID of the wireless node device 20 operating as a Source device, the origination port number included in the connect response message 80A received in step S54, and the destination port number determined in step S52, into the connection information memory 15 in association with one another, and goes to step S3. On the other hand, if a connect request message 70 is received from the wireless node device 20 (if YES in step S56), then in step S57, the controller 11 determines a destination port used to receive video and audio data signals. In step S58, the controller 11 stores a device ID of the wireless node device 20 operating as a Source device, an origination port number included in the connect request message 70 received in step S56, and the destination port number determined in step S57, into the connection information memory 15 in association with one another. In step S59, the wireless node device 10 operating as a Sink device transmits a connect response message 80 to the wireless node device 20 operating as a Source device, including the destination port number determined in step S57, and goes to step S3.

FIG. 20 is a diagram showing an exemplary connection information table in the connection information memory 15 of the wireless node device 10 of FIG. 1. A device ID of Source device field is a field containing a device ID of the wireless node device 20 operating as a Source device to be connected. A origination port number field is a field containing an origination port number of the wireless node device 20 operating as a Source device. A destination port number field is a field containing a destination port number of the wireless node device 10 itself. A stream ID field is a field containing a stream ID which is assigned upon resource reserving process described below, and which is included in a stream start notify message (output format notification message) 90 to be received from the wireless node device 20 operating as a Source device.

In the connecting process step S2 by a Source device of FIG. 7, when there is no free port in step S12, or when receiving a connect response message 80 with a result code indicating a connection failure in step S14, then the controller 21 may end the process. Alternatively, when there is no free port in step S17, the controller 21 may transmit a connect response message 80A to the wireless node device 10 operating as a Sink device, including a result code indicating a connection failure, and then end the process. Further, in the connecting process step S2 by a Sink device of FIG. 11, when there is no free port in step S52, or when receiving a connect response message 80A with a result code indicating a connection failure in step S54, then the controller 11 may end the process. Alternatively, when there is no free port in step S57, the controller 11 may transmit a connect response message 80 to the wireless node device 20 operating as a Source device, including a result code indicating a connection failure, and then end the process. Alternatively, the ports may be set with priorities, and when there is no free port upon receiving a connect request message 70 or 70A, one of the ports in use that has the lowest priority may be released, or a port that has not been used for a long time may be released, and then the released port may be used.

Figure 8:
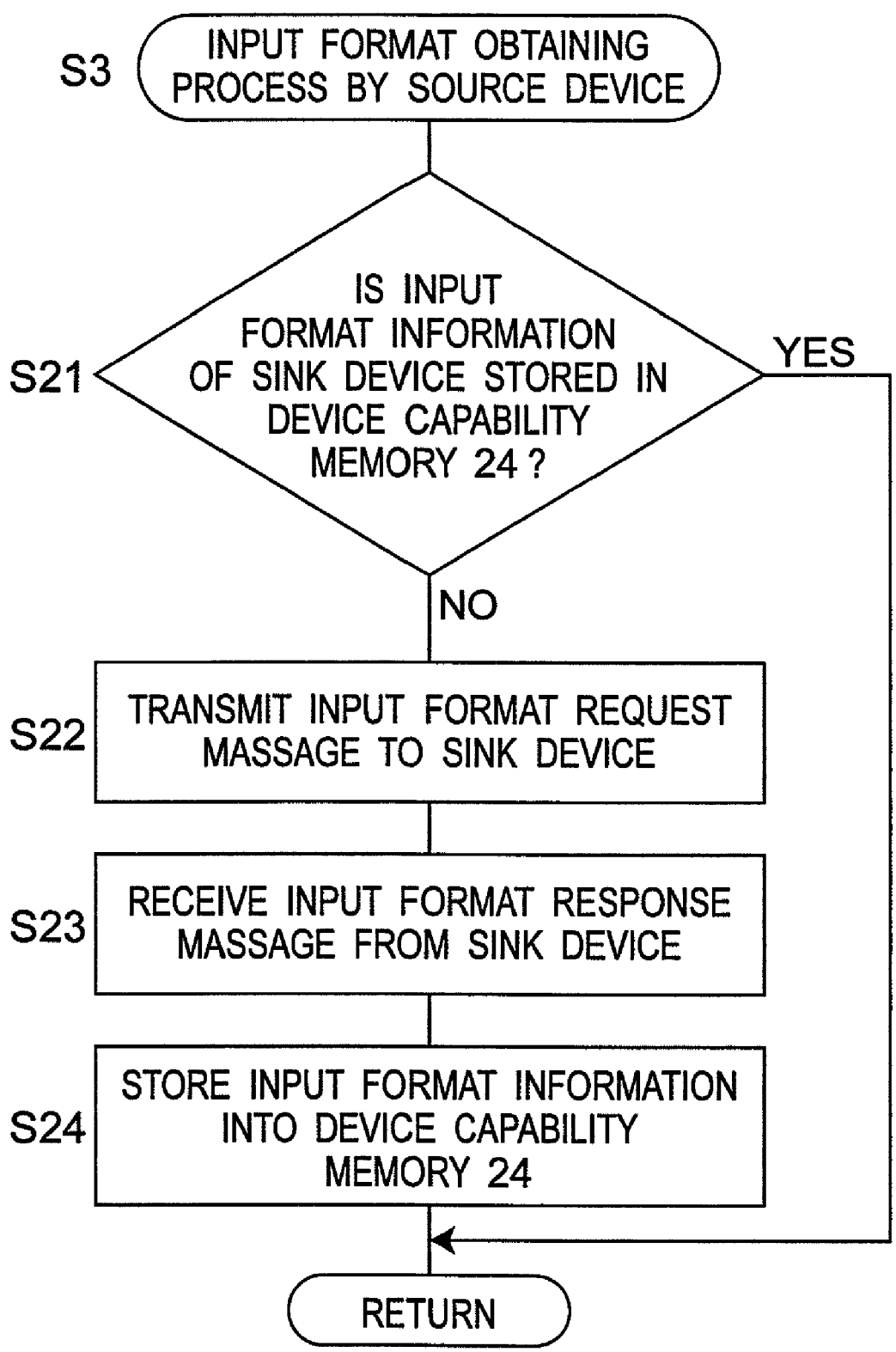
FIG. 8 is a flowchart showing a subroutine of input format obtaining process step S3 of FIG. 6, that is, a subroutine of input format obtaining process step S3 by a Source device which is performed by the wireless node device 20 of FIG. 1.
Figure 12:
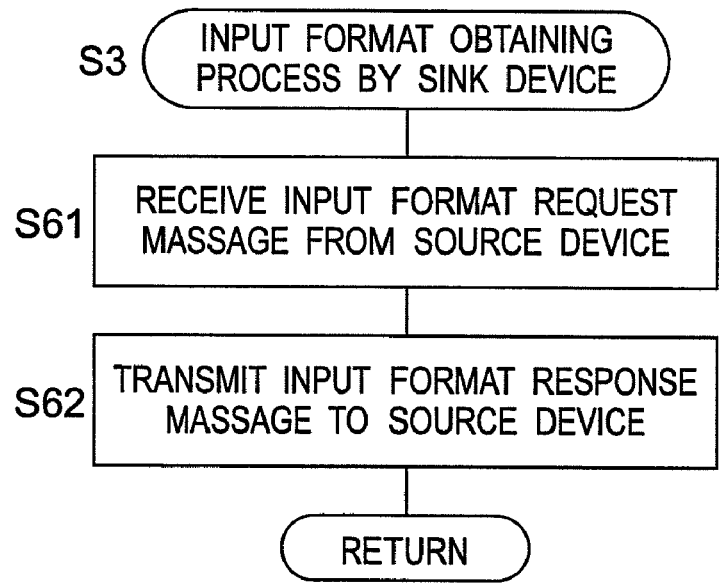
FIG. 12 is a flowchart showing a subroutine of input format obtaining process step S3 of FIG. 6, that is, a subroutine of input format obtaining process step S3 by a Sink device which is performed by the wireless node device 10 of FIG. 1.

Each of FIGS. 8 and 12 shows a subroutine of the input format obtaining process step S3 of FIG. 6. FIG. 8 is a flowchart showing a subroutine of the input format obtaining process step S3 by a Source device which is performed by the wireless node device 20 of FIG. 1, and FIG. 12 is a flowchart showing a subroutine of the input format obtaining process step S3 by a Sink device which is performed by the wireless node device 10 of FIG. 1. After completion of the connecting process step S2, the wireless node device 20 operating as a Source device obtains information on input formats supported by the wireless node device 10 operating as a Sink device. In step S21 of FIG. 8, the controller 21 of the wireless node device 20 determines whether or not input format information of the Sink device is already stored in the device capability memory 24. If YES, then the process goes directly to step S4 with omitting steps S22 to S24; and if NO, then the process goes to step S22. In step S22, the wireless node device 20 operating as a Source device transmits an input format request message to the wireless node device 10 operating as a Sink device. When the wireless node device 10 operating as a Sink device receives the input format request message from the wireless node device 20 operating as a Source device (step S61 of FIG. 12), the controller 11 reads input format information of video and audio data supported by the wireless node device 10 operating as a Sink device, from an EDID-ROM (not shown) of the wireless node device 10. Then, in step S62, the wireless node device 10 operating as a Sink device transmits an input format response message to the wireless node device 20 operating as a Source device, including the read input format information. When the wireless node device 20 operating as a Source device receives the input format response message from the wireless node device 10 operating as a Sink device (step S23 of FIG. 8), then in step S24, the controller 21 stores the input format information included in the received input format response message, into the device capability memory 24, and goes to step S4. Note that the controller 21 of the wireless node device 20 operating as a Source device may store into the device capability memory 24 the input format information obtained during a previous input format obtaining process between the wireless node device 20 and a wireless node device, and accordingly, when transmitting video and audio data signals to the same wireless node device, then as shown in step S21, the controller 21 can omit subsequent steps S22 to S24 of the input format obtaining process. In step S21, the controller 21 refers to the MAC address field of the device capability memory 24, and determines whether or not the same MAC address as that of a wireless node device to be connected is stored in the device capability memory 24, and whether or not corresponding input format information is already stored. In the determination in step S21, it is preferable to refer to the MAC address, and alternatively, other identifiers such as a device ID may be used.

Figure 9:
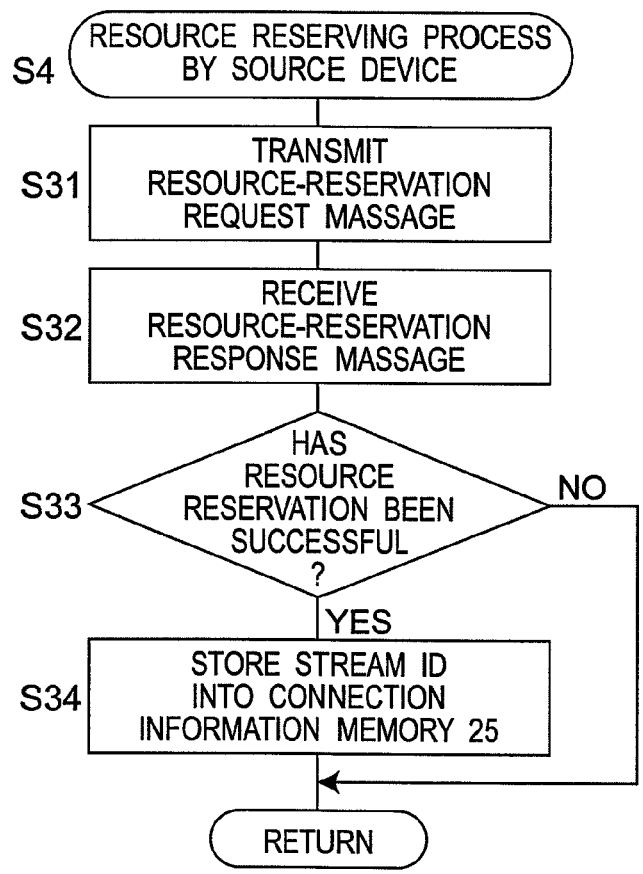
FIG. 9 is a flowchart showing a subroutine of resource reserving process step S4 of FIG. 6, that is, a subroutine of resource reserving process step S4 by a Source device which is performed by the wireless node device 20 of FIG. 1.
Figure 14:
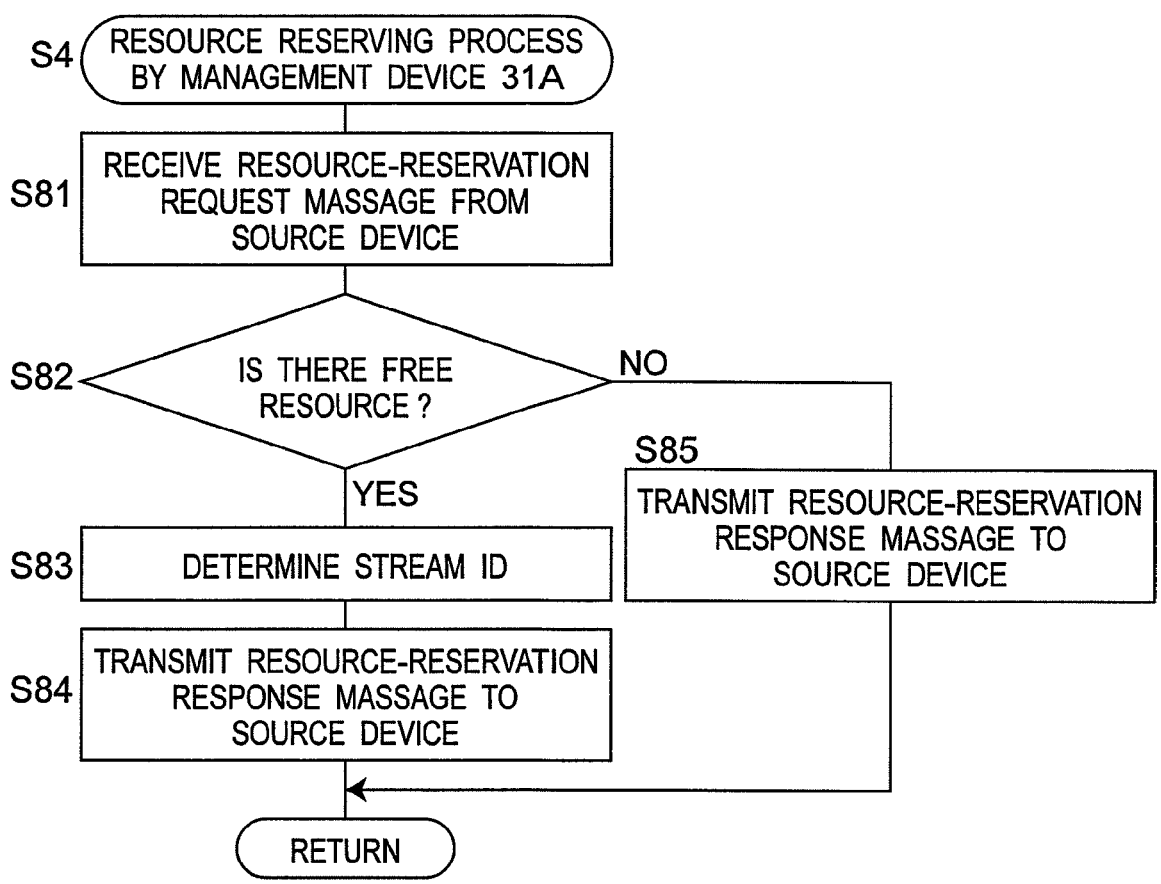
FIG. 14 is a flowchart showing a subroutine of resource reserving process step S4 of FIG. 6, that is, a subroutine of resource reserving process step S4 by a management device 31A which is performed by a wireless node device 30 of FIG. 1.

Each of FIGS. 9 and 14 shows a subroutine of the resource reserving process step S4 of FIG. 6. FIG. 9 is a flowchart showing a subroutine of the resource reserving process step S4 by a Source device which is performed by the wireless node device 20 of FIG. 1, and FIG. 14 is a flowchart showing a subroutine of the resource reserving process step S4 by the management device 31A which is performed by the wireless node device 30 of FIG. 1. After completion of the input format obtaining process step S3, then in step S31 of FIG. 9, the wireless node device 20 operating as a Source device transmits a resource-reservation request message to the wireless node device 30 provided with the management device 31A. The payload of the resource-reservation request message includes an operation code indicating that the message is a resource-reservation request message, and also includes the device ID of the wireless node device 10 operating as a Sink device, and a request ID. The request ID is assigned to identify which resource-reservation request message is responded by a resource-reservation response message described below. Since the resource-reservation request message is transmitted from the wireless node device 20 operating as a Source device, an origination device ID in its header is the same as the device ID of the Source device. Thus, the wireless node device 30 identifies the origination and destination of a stream to which resources are to be assigned, based on the device ID of the wireless node device 10 operating as a Sink device, which is included in the payload of the resource-reservation request message, and based on the origination device ID of the message included in the header (i.e., the device ID of the wireless node device 20 operating as a Source device). In step S81 of FIG. 14, when the management device 31A of the wireless node device 30 receives the resource-reservation request message from the wireless node device 20 operating as a Source device, then in step S82, the management device 31A determines whether or not there is any free resource. If YES, then the process goes to step S83; and if NO, then the process goes to step S85. In step S83, the management device 31A determines resources assigned to transmit video and audio data signals between the wireless node devices 20 and 10, and also determines a stream ID corresponding to the assigned resources. The resources to be assigned include resources required to transmit video and audio data in a determined output format, and if necessary, further include resources required to retransmit the video and audio data. Further, each assigned resource is provided with a stream ID of a different value. In step S84, the wireless node device 30 transmits a resource-reservation response message to the wireless node device 20 operating as a Source device, including a result code indicating that a resource reservation has been successful, the determined stream ID, and the request ID (the same request ID as that included in the resource-reservation request message). In step S85, the wireless node device 30 transmits a resource-reservation response message to the wireless node device 20 operating as a Source device, including a result code indicating that a resource reservation has failed, and the request ID. In step S32 of FIG. 9, when the wireless node device 20 operating as a Source device receives the resource-reservation response message, then in step S33, the controller 21 of the wireless node device 20 determines whether or not a resource reservation has been successful. If YES, then the process goes to step S34; and if NO, then the process goes to the subsequent output format notifying process step S5. In step S34, the controller 21 stores the stream ID included in the resource-reservation response message, into the connection information memory 25 in association with the origination port number and destination port number determined in the connecting process step S2, and goes to the subsequent output format notifying process step S5. It is not necessary that a separate management device 31A performs the resource reserving process, and the resource reserving process may be performed by either the wireless node device 20 operating as a Source device, or the wireless node device 10 operating as a Sink device. The resource reserving process step S4 can be performed any time after the connecting process step S2, and thus, may be performed in parallel with the input format obtaining process step S3.

Figure 10:
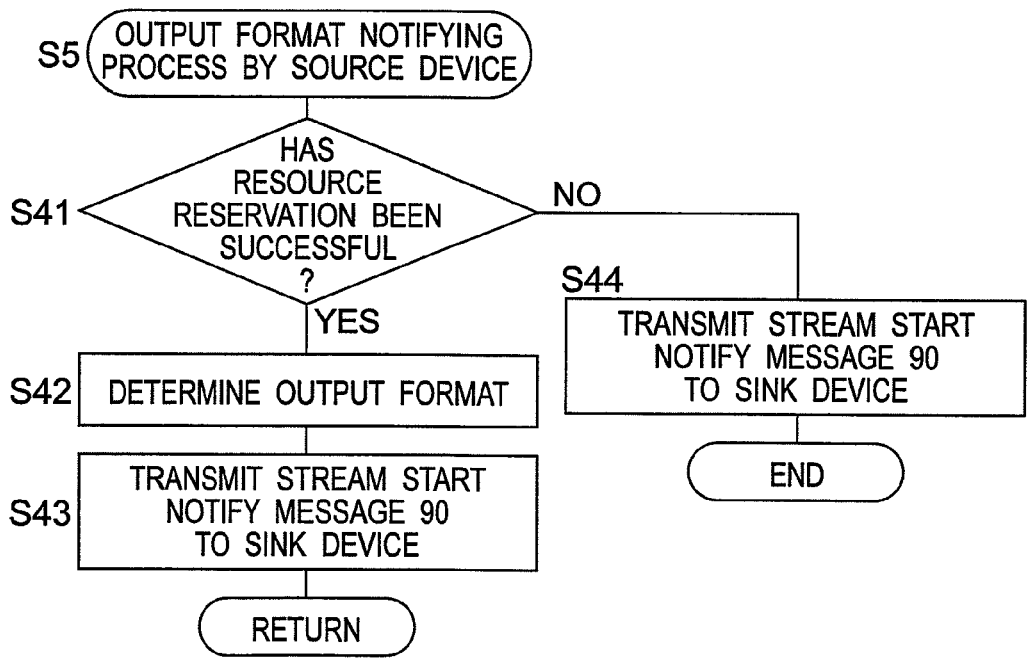
FIG. 10 is a flowchart showing a subroutine of output format notifying process step S5 of FIG. 6, that is, a subroutine of output format notifying process step S5 by a Source device which is performed by the wireless node device 20 of FIG. 1.
Figure 13:
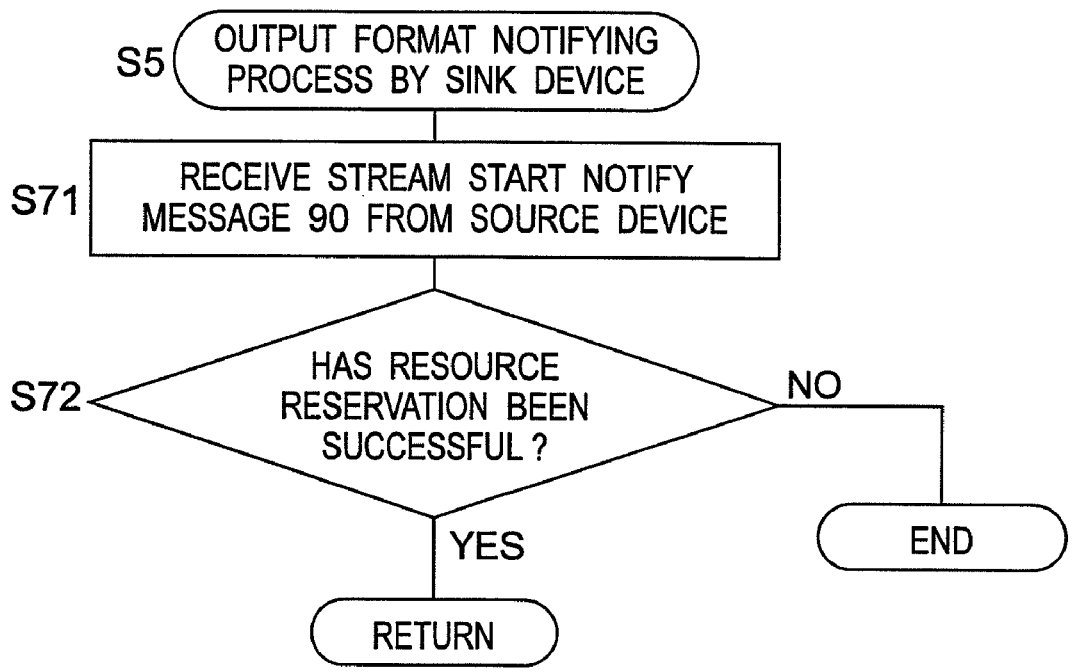
FIG. 13 is a flowchart showing a subroutine of output format notifying process step S5 of FIG. 6, that is, a subroutine of output format notifying process step S5 by a Sink device which is performed by the wireless node device 10 of FIG. 1.

Each of FIGS. 10 and 13 shows a subroutine of the output format notifying process step S5 of FIG. 6. FIG. 10 is a flowchart showing a subroutine of the output format notifying process step S5 by a Source device which is performed by the wireless node device 20 of FIG. 1, and FIG. 13 is a flowchart showing a subroutine of the output format notifying process step S5 by a Sink device which is performed by the wireless node device 10 of FIG. 1. In step S41 of FIG. 10, the controller 21 of the wireless node device 20 operating as a Source device determines whether or not a resource reservation has been successful, based on the result code included in the resource-reservation response message. If YES, then the process goes to step S42; and if NO, then the process goes to step S44. In step S42, the controller 21 selects one format from among input formats obtained at the input format obtaining process step S3, based on a user input through the user input device 26, etc., and determines the format as an output format for transmitting video and audio data signals from the wireless node device 20. Alternatively, in order to determine an output format, the controller 21 of the wireless node device 20 may cause the video output device 17A of the wireless node device 10 to display a selection menu including the obtained input formats, and cause a selection result inputted through the user input device 16 to be transmitted from the wireless node device 10 to the wireless node device 20. Alternatively, an output format may be automatically determined. In step S43, the wireless node device 20 operating as a Source device transmits a stream start notify message 90 to the wireless node device 10 operating as a Sink device, including a result code indicating that a resource reservation has been successful, and the output format information determined in step S42. Further, the output format information includes a code indicating an output format. In step S44, the wireless node device 20 operating as a Source device transmits a stream start notify message 90 to the wireless node device 10 operating as a Sink device, including a result code indicating that a resource reservation has failed, and ends the process. In step S71 of FIG. 13, the wireless node device 10 operating as a Sink device receives the stream start notify message 90 from the wireless node device 20 operating as a Source device. Then, in step S72, the controller 11 of the wireless node device 10 operating as a Sink device determines whether or not a resource reservation has been successful, based on the result code included in the stream start notify message 90. If YES, then the controller 11 waits for reception of video and audio data signals; and if NO, then the controller 11 ends the process. Step S42 of FIG. 10 of determining an output format can be performed any time after the input format obtaining process step S3, and thus, may be performed before step S41 and in parallel with the resource reserving process step S4. However, steps S43 and S44 of transmitting a stream start notify message require a result code indicating whether or not a resource reservation has been successful, and thus, should be performed after performing the resource reserving process step S4.

Figure 21:
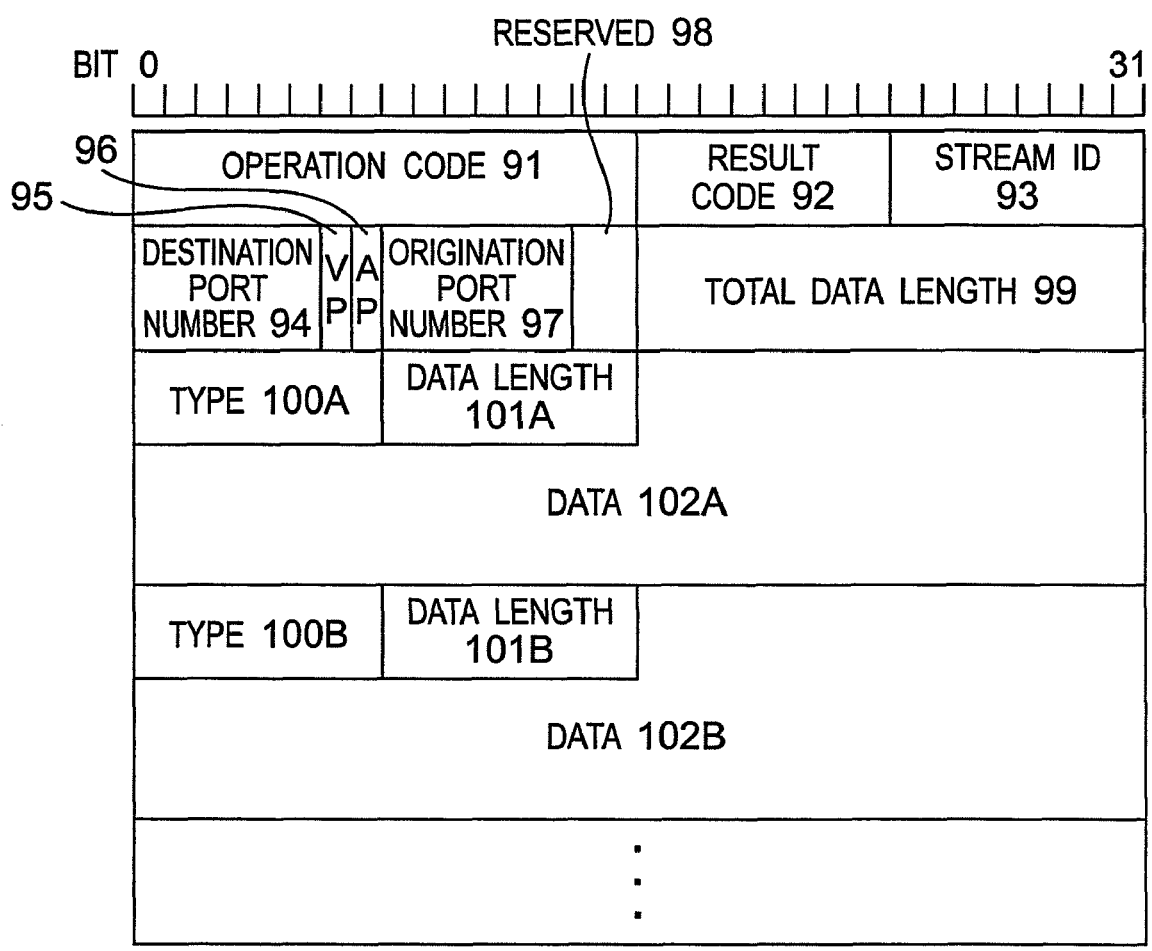
FIG. 21 is a diagram showing an exemplary format of a stream start notify message 90 of FIGS. 10 and 13.

FIG. 21 is a diagram showing an exemplary format of the stream start notify message 90 of FIGS. 10 and 13. The stream start notify message 90 includes an operation code field 91, a result code field 92, a stream ID field 93, a destination port number field 94, a VP field 95, an AP field 96, an origination port number field 97, a reserved field 98, a total data length field 99, type fields 100A, 100B, . . . , data length fields 101A, 101B, . . . , and data fields 102A, 102B, A header of the stream start notify message 90 includes respective device IDs of the destination wireless node device 10 and origination wireless node device 20. The operation code field 91 is a field containing a code indicating that the message is the stream start notify message 90. The result code field 92 is a field containing a code indicating a result of the resource reserving process step S4. The stream ID field 93 is a field containing a stream ID obtained in the resource reserving process step S4. The destination port number field 94 is a field containing a destination port number. The VP field 95 is a field containing a flag indicating whether or not video data is to be transmitted through the port. The AP field 96 is a field containing a flag indicating whether or not audio data is to be transmitted through the port. The origination port number field 97 is a field containing an origination port number. The reserved field 98 is a field reserved for future expansion. The total data length field 99 is a field containing the data length of the stream start notify message 90. Each of the type fields 100A, 100B, . . . is a field containing a value indicating the type of information included in its corresponding data field 102A, 102B, . . . . Each of the data length fields 101A, 101B, . . . is a field containing the data length of its corresponding data field 102A, 102B, . . . . Each of the data fields 102A, 102B, . . . is a field containing data in a video output format and an audio output format. The VP field 95, the AP field 96, the destination port number field 94, and the origination port number field 97 are set with the same values as values set in corresponding fields of a connect response message 80 or connect request message 70A.

Referring to FIG. 6 again, after completion of steps S2 to S5, then in step S6, the wireless node device 20 operating as a Source device, starts to transmit video and audio data signals to the wireless node device 10 operating as a Sink device. When the controller 21 of the wireless node device 20 operating as a Source device transmits video and audio data signals, the controller 21 inserts part or all of the device ID of the wireless node device 10 operating as a Sink device, the associated origination port number and destination port number, and the stream ID which are stored in the connection information memory 25, into corresponding fields in a header of each packets of video and audio data signals. For example, the device ID can be inserted into a device ID field or destination address containing field in a MAC header, the destination port number can be inserted into a destination port number field of a video or audio data header, and the stream ID can be inserted into a stream ID field in the MAC header.

As described above, the wireless node device 20 associates its origination port with the video and audio player 27, and the wireless node device 10 associates its destination port with the video output device 17A and the audio output device 17B, and further, the origination port of the wireless node device 20 and the destination port of the wireless node device 10 are also associated with each other. Therefore, video and audio data signals played back by the video and audio player 27 of the wireless node device 20 are transmitted through the origination port of the wireless node device 20 and the destination port of the wireless node device 10, and outputted to the video output device 17A and the audio output device 17B of the wireless node device 10. In the wireless node device 10 operating as a Sink device, video and audio data signals received through a certain destination port are outputted to the video output device 17A and/or the audio output device 17B associated with the destination port. Alternatively, the received video and audio data signals are outputted to the video output device 17A and/or the audio output device 17B associated with a destination port associated with a stream ID set in a stream ID field of a MAC header.

When the transmission of video and audio data signals is completed, the respective controllers 11 and 21 of the wireless node devices 10 and 20 release the resources used for transmission, and delete information on the origination port number, the destination port number, and the stream ID in the connection information tables in the connection information memories 15 and 25. On the other hand, information in the device capability memories 14 and 24 is held until the wireless node devices 10 and 20 leave the wireless communication system.

Note that mere examples of the packet format of each message and the table formats of the device capability memory 24 and the connection information memories 15 and 25 are shown in the present embodiment, and thus, different formats can be used as long as they have similar effects. Note also that mere exemplary configurations of the wireless communication system and the wireless node devices are shown in the present embodiment, and thus, the configurations are not limited to those exemplary ones.

Although FIG. 1 shows that each radio signals 41 and 42 includes both a video data signal and an audio data signal, the present invention is not limited to the embodiment transmitting both a video data signal and an audio data signal by using resources associated with one stream ID (i.e., resources associated with a pair of an origination port number and a destination port number), and thus, may include an embodiment transmitting only one of a video data signal and an audio data signal.

Second Embodiment

Figure 22:
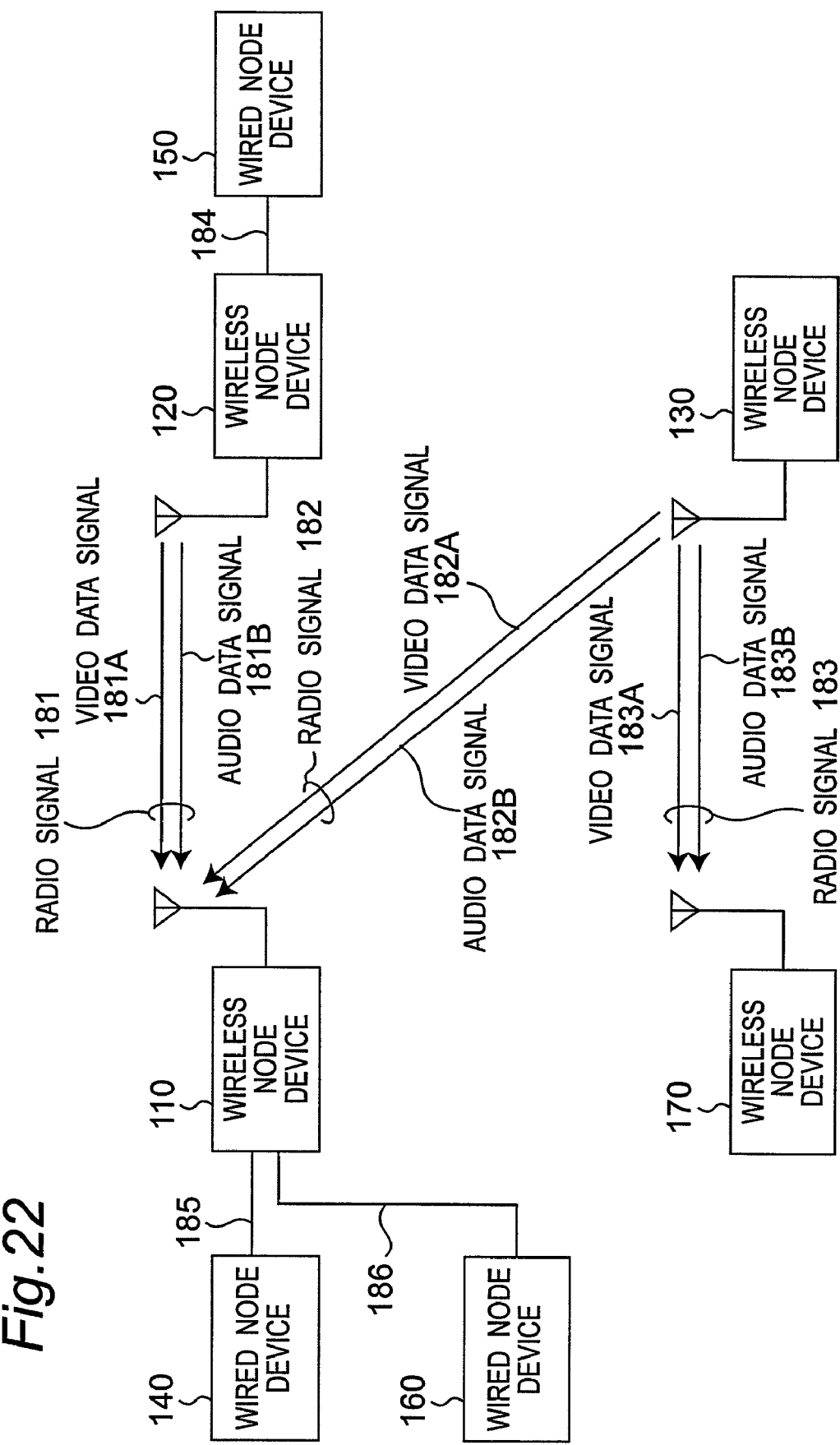
FIG. 22 is a diagram showing a schematic configuration of a wireless communication system according to a second embodiment of the present invention.

FIG. 22 is a diagram showing a schematic configuration of a wireless communication system according to a second embodiment of the present invention. FIGS. 23 to 26 are block diagrams showing detailed configurations of wireless node devices 110, 120, 130, and 170 and wired node devices 140, 150, and 160 of FIG. 22. The present embodiment provides a wireless communication system including more node devices than that of the first embodiment, and including node devices connected through wired interfaces. In FIGS. 22 to 26, the wired node devices 140, 150, and 160 are AV equipments configured as devices provided with only conventional HDMI wired interfaces, and transmitting video and audio data signals through wired connections. The wireless node devices 130 and 170 are AV equipments configured as devices provided with only wireless interfaces, and transmitting video and audio data signals through wireless sections. The wireless node devices 110 and 120 are AV equipments configured as devices provided with wireless interfaces and conventional HDMI wired interfaces, and transmitting video and audio data signals through wireless sections and wired connections. In this case, the wireless node device 110 and the wired node device 140 are connected to each other through an HDMI cable 185, the wireless node device 110 and the wired node device 160 are connected to each other through an HDMI cable 186, and the wireless node device 120 and the wired node device 150 are connected to each other through an HDMI cable 184. The wireless node device 120 transmits a radio signal 181 including a video data signal 181A and an audio data signal 181B to the wireless node device 110. The wireless node device 130 transmits a radio signal 182 including a video data signal 182A and an audio data signal 182B to the wireless node device 110, and transmits a radio signal 183 including a video data signal 183A and an audio data signal 183B to the wireless node device 170. The transmissions of the respective radio signals 181, 182, and 183 may be multiplexed by using the frequency-division multiplexing in different radio frequency bands, or may be multiplexed by using the time-division multiplexing in different times.

In the present embodiment with the configuration as shown in FIG. 22, for example, the wired node device 150 can transmit video and audio data via the wireless node devices 120 and 110 to the wired node devices 140 and 160, and the wireless node device 130 can transmit video and audio data via the wireless node device 110 to the wired node devices 140 and 160.

Figure 23:
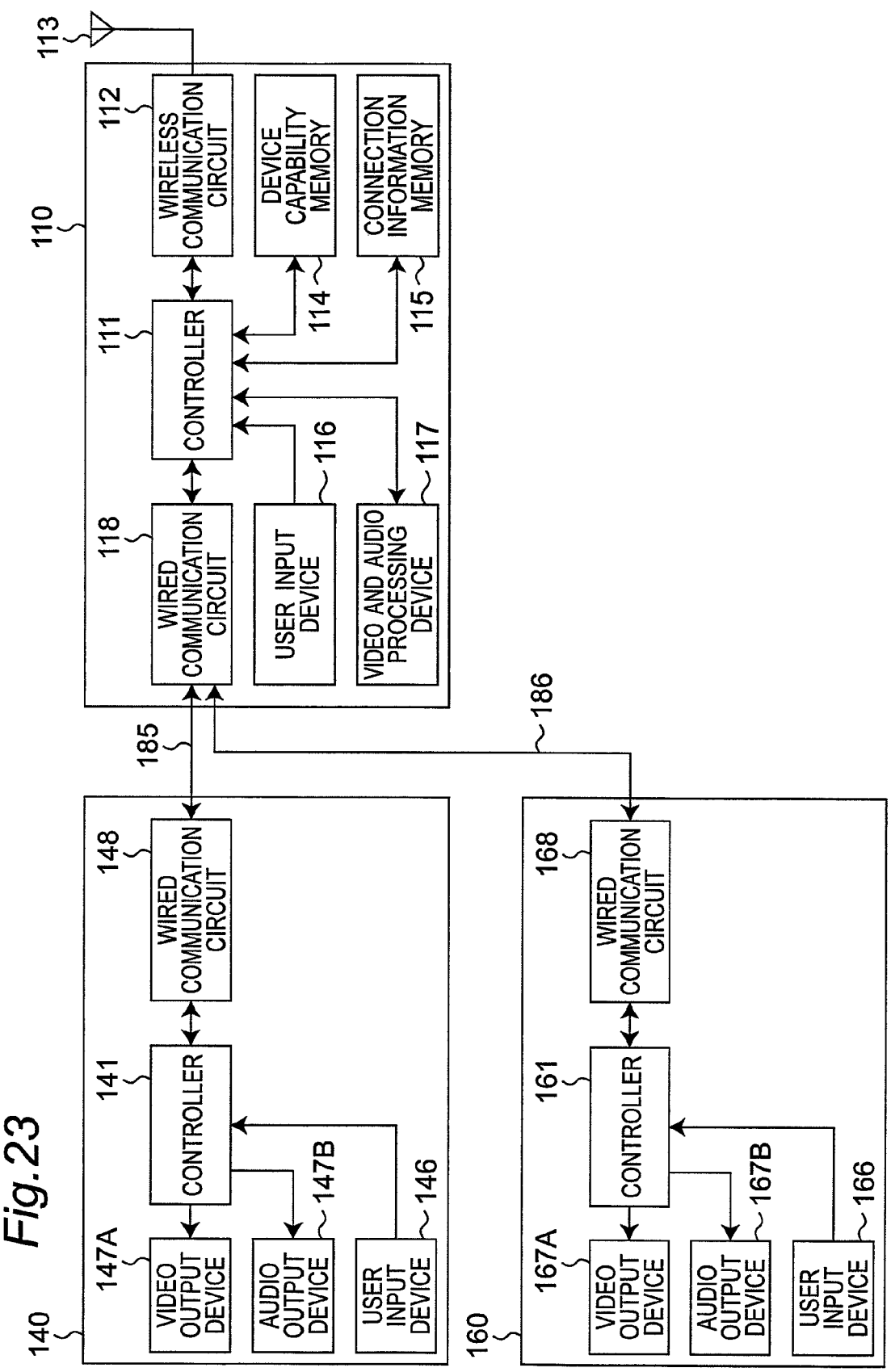
FIG. 23 is a block diagram showing detailed configurations of a wireless node device 110 and a wired node devices 140 and 160 of FIG. 22.

Referring to FIG. 23, the wireless node device 110 operating as a Sink device in a wireless section of the wireless communication system of FIG. 22 is provided with: a wireless communication circuit 112 connected to an antenna 113 and serving as a wireless interface; a video and audio processing device 117 such as an amplifier; a wired communication circuit 118 performing HDMI transmitting processes of video and audio data signals; and a controller 111 controlling these components. The controller 111 are further connected with: a device capability memory 114, a connection information memory 115, and a user input device 116. In a manner similar to that of the controller 11 of the wireless node device 10 in the first embodiment, the controller 111 performs the medium access control, resource management, port control, connection management, and application control. The wireless communication circuit 112 has a high-speed data reception function of receiving data at a high transmission rate, and a low-speed data transmission and reception function of transmitting and receiving data at a low transmission rate. The device capability memory 114, the connection information memory 115, and the user input device 116 are configured in a manner similar to that of the corresponding components of the wireless node device 10 in the first embodiment. Further, referring to FIG. 23, the wired node device 140 connected to the wireless node device 110 is provided with: a wired communication circuit 148, a video output device 147A such as a display, an audio output device 147B such as speakers, and a controller 141 controlling these components. The controller 141 is further connected with a user input device 146. The user input device 146, the video output device 147A, and the audio output device 147B are configured in a manner similar to that of the corresponding components of the wireless node device 10 in the first embodiment. The wired communication circuit 148 is configured in a manner similar to that of the wired communication circuit 118 of the wireless node device 110. Furthermore, the wired node device 160 connected to the wireless node device 110 is provided with: in a manner similar to that of the wired node device 140, a wired communication circuit 168; a video output device 167A; an audio output device 167B; a controller 161 controlling these components; and a user input device 166 connected to the controller 161. In the present embodiment, the wireless node device 110 operates as a receiver adapter for providing a wireless reception function for the wired node devices 140 and 160.

Figure 24:
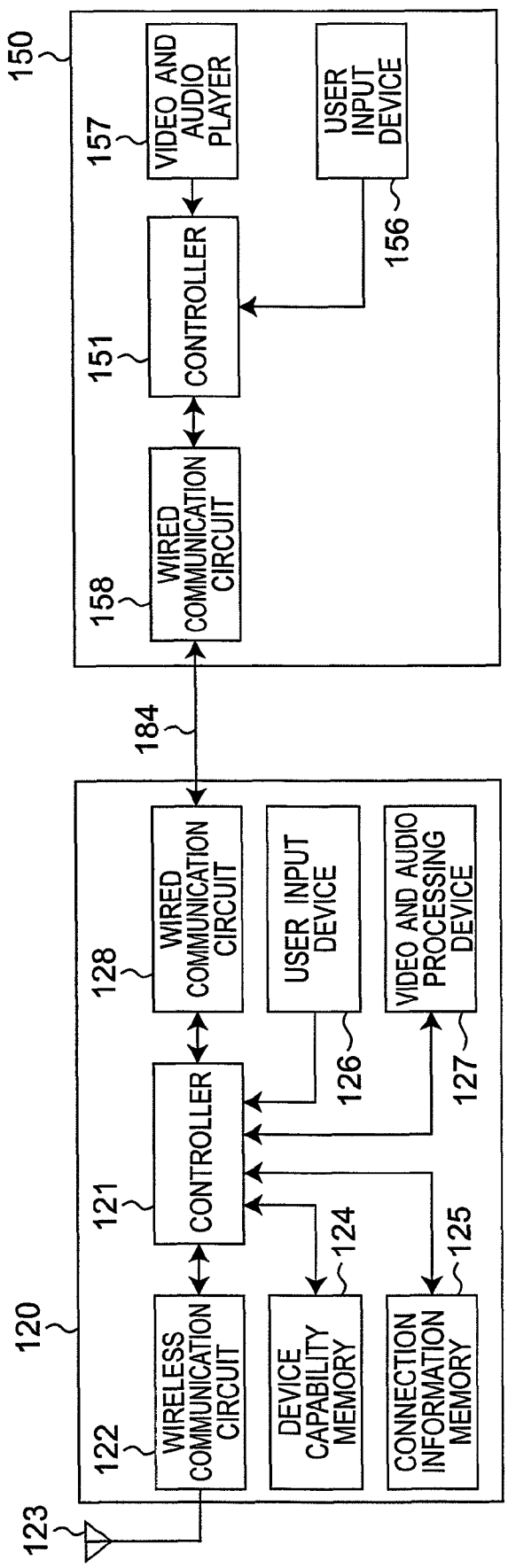
FIG. 24 is a block diagram showing detailed configurations of a wireless node device 120 and a wired node device 150 of FIG. 22.

Referring to FIG. 24, the wireless node device 120 operating as a Source device in a wireless section of the wireless communication system of FIG. 22 is provided with: a wireless communication circuit 122 connected to an antenna 123 and serving as a wireless interface; a video and audio processing device 127 such as an amplifier; a wired communication circuit 128; and a controller 121 controlling these components. The controller 121 are further connected with: a device capability memory 124, a connection information memory 125, and a user input device 126. In a manner similar to that of the controller 111 of the wireless node device 110, the controller 121 performs the medium access control, resource management, port control, connection management, and application control. The wireless communication circuit 122 has a high-speed data transmission function of transmitting data at a high transmission rate, and a low-speed data transmission and reception function of transmitting and receiving data at a low transmission rate. Further, the device capability memory 124, the connection information memory 125, and the user input device 126 are configured in a manner similar to that of the corresponding components of the wireless node device 20 in the first embodiment. The video and audio processing device 127 is configured in a manner similar to that of the corresponding component of the wireless node device 110. Further, referring to FIG. 24, a wired node device 150 connected to the wireless node device 120 is provided with: a wired communication circuit 158; a video and audio player 157 such as a DVD player and an STB; and a controller 151 controlling these components. The controller 151 is further connected with a user input device 156. The user input device 156 and the video and audio player 157 are configured in a manner similar to that of the corresponding components of the wireless node devices 20 and 30 in the first embodiment. The wired communication circuit 158 is configured in a manner similar to that of the wired communication circuit 118 of the wireless node device 110. In the present embodiment, the wireless node device 120 operates as a receiver adapter for providing a wireless transmission function for the wired node device 150.

Figure 25:
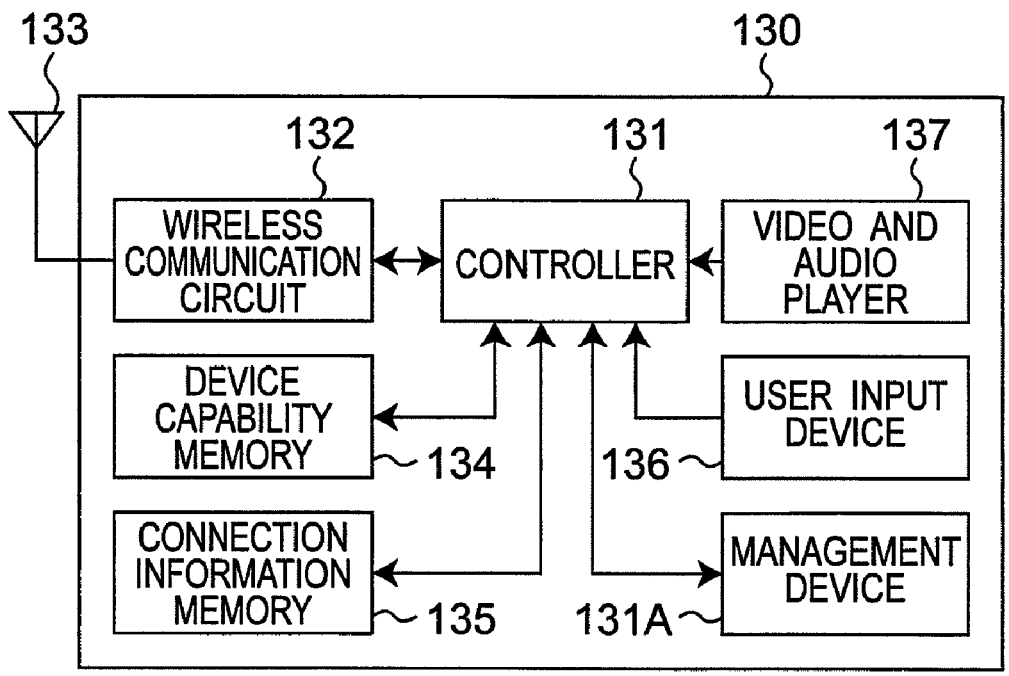
FIG. 25 is a block diagram showing a detailed configuration of a wireless node device 130 of FIG. 22.

Referring to FIG. 25, the wireless node device 130 operating as another Source device in a wireless section of the wireless communication system of FIG. 22 is provided with: a wireless communication circuit 132 connected to an antenna 133 and serving as a wireless interface; a video and audio player 137 such as a DVD player and an STB; a management device 131A that manages information on wireless resources in the wireless communication system (radio frequency bands or times); and a controller 131 controlling these components. The controller 131 are further connected with: a device capability memory 134, a connection information memory 135, and a user input device 136. In a manner similar to that of the controller 111 of the wireless node device 110, the controller 131 performs the medium access control, resource management, port control, connection management, and application control. The management device 131A is configured in a manner similar to that of the management device 31A of the wireless node device 30 in the first embodiment. Further, the wireless communication circuit 132, the device capability memory 134, the connection information memory 135, and the user input device 136 are configured in a manner similar to that of the corresponding components of the wireless node device 120. The video and audio player 137 is configured in a manner similar to that of the corresponding component of the wired node device 150.

Figure 26:
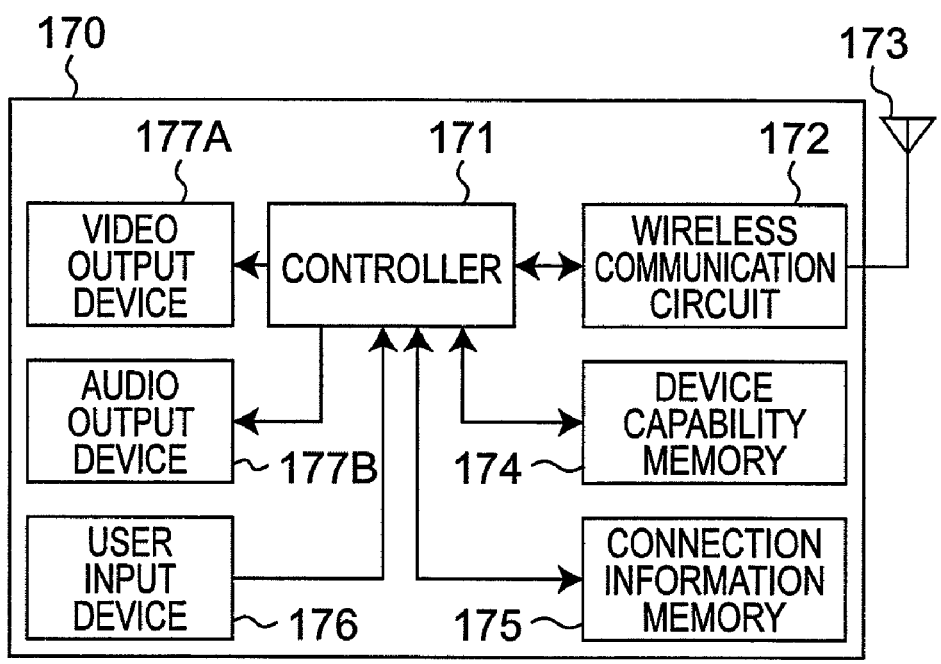
FIG. 26 is a block diagram showing a detailed configuration of a wireless node device 170 of FIG. 22.

Referring to FIG. 26, the wireless node device 170 operating as another Sink device in a wireless section of the wireless communication system of FIG. 22 is provided with: a wireless communication circuit 172 connected to an antenna 173 and serving as a wireless interface; a video output device 177A; an audio output device 177B; and a controller 171 controlling these components. The controller 171 are further connected with: a device capability memory 174, a connection information memory 175, and a user input device 176. In a manner similar to that of the controller 111 of the wireless node device 110, the controller 171 performs the medium access control, resource management, port control, connection management, and application control. Further, the wireless communication circuit 172, the device capability memory 174, the connection information memory 175, and the user input device 176 are configured in a manner similar to that of the corresponding components of the wireless node device 110. The video output device 177A and the audio output device 177B are configured in a manner similar to that of the corresponding components of the wired node devices 140 and 160.

In the wireless communication system of FIG. 22, each of the wired node devices 140 and 160 and the wireless node device 170 includes both a video output device and an audio output device, but may include only one of the video output device and the audio output device.

In the present embodiment, each of the wireless node devices 110 and 170 operating as Sink devices associates a port of its wireless communication circuit (i.e., a destination port) with an output device. Specifically, the wireless communication circuit 112 of the wireless node device 110 has two ports used as destination ports, and associates one port with the video output device 147A and the audio output device 147B of the wired node device 140, and associates the other port with the video output device 167A and the audio output device 167B of the wired node device 160. Accordingly, the wireless node device 110 outputs video and audio data signals received at one port of the wireless communication circuit 112, to the wired node device 140, and outputs video and audio data signals received at the other port, to the wired node device 160. The wireless communication circuit 172 of the wireless node device 170 has one port used as a destination port, and associates the port with its video output device 177A and the audio output device 177B. Further, in the case that a wireless communication circuit of each of the wireless node devices 110 and 170 has a plurality of ports used as destination ports, distinct ports may be used as a destination port for a video data signal and a destination port for an audio data signal. For example, the wireless node device 110 may output a video data signal received at one port of the wireless communication circuit 112, to the video output device 117A of the wired node device 140, and may output an audio data signal received at the other port, to another wired node device (e.g., an amplifier). Alternatively, in the case that the wireless communication circuit 172 of the wireless node device 170 has a plurality of ports used as destination ports, the wireless node device 170 may receive a plurality of different video data signals through the respective ports, and the controller 171 may process those video data signals so as to simultaneously display the video data signals on a screen of the video output device (a display) which is divided into a plurality of regions. Similarly, each of the wireless node devices 120 and 130 operating as Source devices associates a port of its wireless communication circuit (i.e., an origination port) with a player. Specifically, the wireless communication circuit 122 of the wireless node device 120 has one port used as an origination port and associates the port with the video and audio player 157 of the wired node device 150, and the wireless communication circuit 132 of the wireless node device 130 has one port used as an origination port and associates the port with its video and audio player 137. Furthermore, in the case that the wireless communication circuit 122 of the wireless node device 120 operating as a Source device has a plurality of ports used as origination ports, and the wired communication circuit 128 is further connected to another wired node device, the wireless node device 120 may associate its ports with different wired node devices.

In the wireless communication system according to the present embodiment, the wireless node device 120 associates its origination port with the video and audio player 157 of the wired node device 150, the wireless node device 110 associates its one destination port with the video output device 147A and the audio output device 147B of the wired node device 140, and furthermore, the origination port of the wireless node device 120 and the destination port of the wireless node device 110 are also associated with each other as described below. Accordingly, video and audio data signals played back by the video and audio player 157 of the wired node device 150 are transmitted through the origination port of the wireless node device 120 and the destination port of the wireless node device 110 to the video output device 147A and the audio output device 147B of the wired node device 140.

Figure 27:
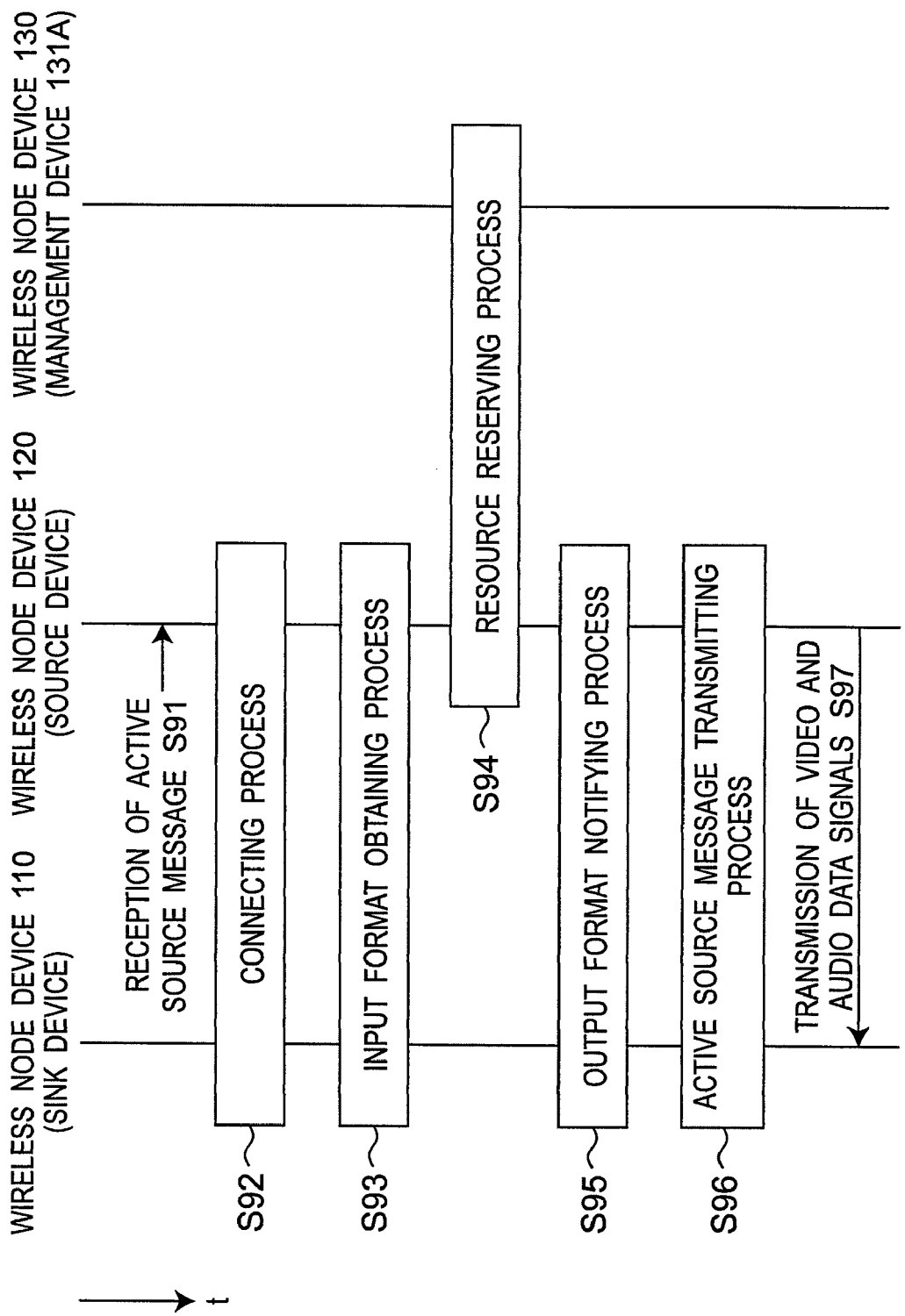
FIG. 27 is a sequence diagram showing a wireless communicating process which is performed by the wireless communication system of FIG. 22 when an Active Source message is received by the wireless node device 120 of FIG. 22.

With reference to FIG. 27, a wireless communicating process according to the present embodiment will be described below. FIG. 27 is a sequence diagram showing a wireless communicating process which is performed by the wireless communication system of FIG. 22 when the wireless node device 120 of FIG. 22 receives an HDMI Active Source message. The wireless communicating process of FIG. 27 is performed, particularly, when a playback button is pressed on the user input device 156 of the wired node device 150 connected by wire to the wireless node device 120, and in response thereto, an Active Source message is transmitted from the wired node device 150 to the wireless node device 120 for starting transmission of video and audio data signals. In step S91, when the wireless node device 120 has detected reception of an Active Source message, then in step S92, the wireless node devices 110 and 120 perform a connecting process for determining a pair of an origination port number and a destination port number for transmitting video and audio data signals. The connecting process step S92 is substantially the same with step S2 of FIG. 6, except that step S16 of FIG. 7 and step S51 of FIG. 11 are always NO, since a connect request message 70A is never transmitted from the wireless node device 10 operating as a Sink device. Note that in the case that there are a plurality of wireless node devices 110 and 170 operating as Sink devices as shown in FIG. 22, the wireless node device 120 operating as a Source device may communicate with a wireless node device which is of a predetermined device (e.g., a TV, display, or amplifier) or a wireless node device connected to a wired node device which is of a predetermined device. After completion of the connecting process, then in step S93, an input format obtaining process is performed in which the wireless node device 120 operating as a Source device obtains information on supported input formats from the wireless node device 110 operating as a Sink device. The input format obtaining process step S93 is substantially the same with step S3 of FIG. 6, and the wireless node device 110 determines input format information to be returned to the wireless node device 120, based on input formats supported by the wireless node device 110 and input formats supported by the wired node devices 140 and 160. After completion of the input format obtaining process, then in step S94, the wireless node device 120 operating as a Source device performs a resource reserving process for reserving radio frequency bands or times for transmitting video and audio data signals, in cooperation with the management device 131A in the wireless node device 130. The resource reserving process step S94 is substantially the same with step S4 of FIG. 6. After completion of the resource reserving process, then in step S95, an output format notifying process is performed in which the wireless node device 120 operating as a Source device notifies the wireless node device 110 operating as a Sink device, of an output format of video and audio data signals. The output format notifying process step S95 is substantially the same with step S5 of FIG. 6. After completion of the output format notifying process, then in step S96, an Active Source message transmitting process is performed in which the wireless node device 120 operating as a Source device encapsulates the Active Source message received in step S91 into a wireless packet, and wirelessly transmits it to the wireless node device 110 operating as a Sink device. When the wireless node device 110 receives the Active Source message wirelessly transmitted, the wireless node device 110 transmits the Active Source message to the wired node device 140 or 160. After completion of steps S92 to S96, then in step S97, the wireless node device 120 transmits video and audio data signals to the wireless node device 110.

FIG. 29 is a diagram showing an exemplary device capability table in the device capability memory 124 of the wireless node device 120 of FIG. 22. In the present embodiment, the device ID of the wireless node device 110 is "0", the device ID of the wireless node device 120 is "1", the device ID of the wireless node device 130 is "2", and the device ID of the wireless node device 170 is "3". Data of a device type field, a high-speed transmission capability field, a high-speed reception capability field, an MAC address field, and a device name field is obtained by performing a device capability obtaining process described with reference to FIGS. 2 to 4. Data of an input format field is obtained by performing the input format obtaining process step S93, and in the example shown in FIG. 29, the data includes input formats F1 and F2 respectively corresponding to the wired node devices 140 and 160, and an input format F3 corresponding to the wireless node device 170. Further, a priority field is a field provided for the wireless node devices 110 and 170 operating as Sink devices, and the field contains data of priority information used for selecting each wireless node device as a destination. In the case that there are a plurality of Sink devices (i.e., the wireless node devices 110 and 170) as shown in FIG. 22, a Sink device to be used may be selected by performing an output device selecting process described below with reference to FIG. 28, before playing back video and audio data. The priorities are obtained in advance based on user inputs, or determined based on the order in which wireless node devices are detected. For example, the priority information is obtained in a manner in which any wireless node device (e.g., the wireless node device 110) displays a selection menu on any video output device (e.g., the video output device 147A of the wired node device 140) for a user to input priorities. The obtained priority information is stored in the device capability memories 124 and 134 of the wireless node devices 120 and 130 operating as Source devices. Data of the device ID field, the device type field, the high-speed transmission capability field, the high-speed reception capability field, the MAC address field, and the device name field is shared among all of the wireless node devices 110, 120, 130, and 170. On the other hand, data of the input format field and the priority field is not stored in the device capability memories 114 and 174 of the wireless node devices 110 and 170 operating as Sink devices, but stored only in the device capability memories 124 and 134 of the wireless node devices 120 and 130 operating as Source devices.

FIG. 30 is a diagram showing an exemplary connection information table in the connection information memory 125 of the wireless node device 120 of FIG. 22. FIG. 31 is a diagram showing an exemplary connection information table in the connection information memory 135 of the wireless node device 130 of FIG. 22. FIG. 32 is a diagram showing an exemplary connection information table in the connection information memory 115 of the wireless node device 110 of FIG. 22. FIG. 33 is a diagram showing an exemplary connection information table in the connection information memory 175 of the wireless node device 170 of FIG. 22. The connection information tables of FIGS. 30 to 33 are configured in a manner similar to that of the connection information tables of FIGS. 19 and 20 by performing the connecting process step S92.

Figure 28:
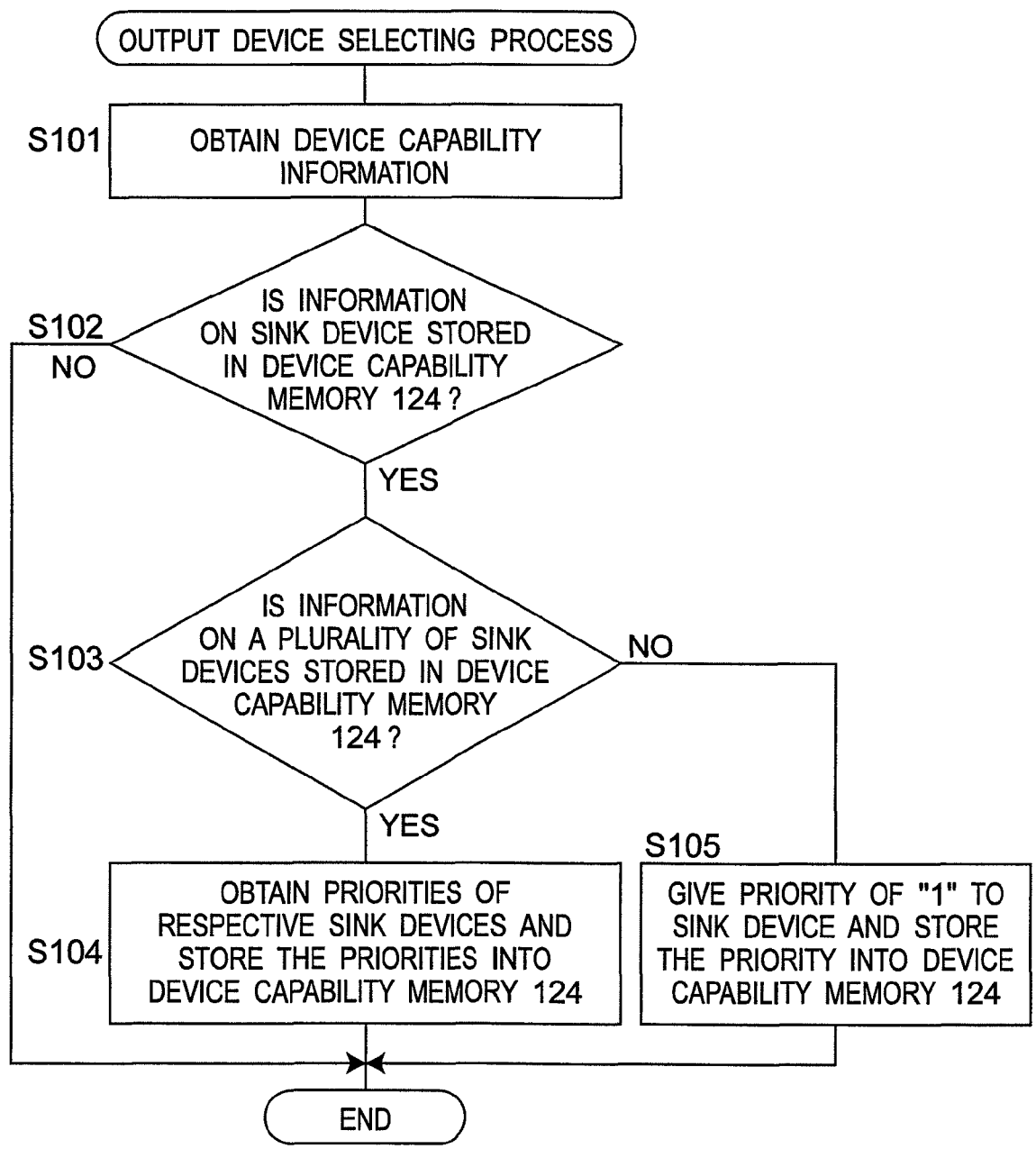
FIG. 28 is a flowchart showing an output device selecting process which is performed by the wireless node device 120 of FIG. 22.

FIG. 28 is a flowchart showing an output device selecting process which is performed by the wireless node device 120 of FIG. 22. In step S101, the controller 121 of the wireless node device 120 obtains device capability information (see FIG. 2), then in step S102, the controller 121 determines whether or not information on any Sink device is stored in the device capability memory 124. If YES, then the process goes to step S103; and if NO, then the process ends. In step S103, the controller 121 determines whether or not information on a plurality of Sink devices is stored in the device capability memory 24. If YES, then the process goes to step S104; and if NO, then the process goes to step S105. In step S104, the controller 121 obtains priorities of the respective Sink devices and stores the priorities into the device capability memory 124, and then ends the process. In step S105, the controller 121 assigns a priority of "1" to the Sink device and stores the priority into the device capability memory 124, and then ends the process. After completion of the output device selecting process, when performing a wireless communicating process of FIG. 27, the controller 121 of the wireless node device 120 selects a wireless node device operating as a Sink device, based on the priorities, and performs steps S92, S93, and S95 to S97 with the selected wireless node device.

The priorities of Sink devices can be determined by performing the output device selecting process of FIG. 28, and accordingly, even when there are a plurality of wireless node devices operating as Sink devices, it is possible to select one of the wireless node devices that has the highest priority, and then perform a wireless communicating process. The wireless node device 120 operating as a Source device performs a wireless communicating process with one of the wireless node devices 110 and 170 operating as Sink devices, based on the priorities. In the case that the wireless node device 110 is selected as a Sink device based on the priorities, the wireless node device 110 outputs video and audio data signals to the wired node device 140 or 160 according to the association between its port and an output device.

Accordingly, in the example described with reference to FIGS. 28 to 33, the wireless node device 120 operating as a Source device considers the wireless node device 110 operating as a receiver adapter and the wireless node device 170 operating as a TV with a wireless reception function to be comparable with each other. Since the priority of the receiver adapter is considered to be comparable with that of the TV, the receiver adapter itself is assigned with a priority, which is compared with priorities assigned to other TVs, etc. for performing a connecting process. If the priority of the receiver adapter is set to the highest, the wireless node device 120 is connected to the receiver adapter, and thereafter, video is outputted to an output device which is associated with a port in the receiver adapter (e.g., a TV of the wired node device 140 or 160).

Instead of determining priorities of the wireless node devices 110 and 170 operating as Sink devices, as described above, it is also possible to determine priorities of all node devices provided with a video output device or audio output device (i.e., not the wireless node device 110, but the wired node devices 140 and 160, and the wireless node device 170). FIG. 34 is a diagram showing an exemplary device capability table in a device capability memory 124 of a wireless node device 120 in a wireless communication system according to a modification of the second embodiment of the present invention. The device capability table of the present modification includes the respective fields of the device capability table of FIG. 29, and further includes, in the case that a wireless node device operating as a Sink device is connected to a plurality of wired node devices, an output device ID field containing data for identifying an output device of each wired node device. Data of an input format field and a priority field is individually stored for output devices each identified by a device ID and an output device ID. A wireless node device 110 operating as a Sink device and having a device ID=0 has an output device ID=1 corresponding to a video output device 147A and an audio output device 147B of a wired node device 140, and an output device ID=2 corresponding to a video output device 167A and an audio output device 167B of a wired node device 160. A wireless node device 170 operating as a Sink device and having a device ID=3 has an output device ID=1 corresponding to a video output device 177A and an audio output device 177B of the wireless node device 170. The output device IDs indicate output interface numbers of the wireless node devices 110 and 170 operating as Sink devices, or indicate model numbers, serial numbers, etc. of the wired node devices 140 and 160 and the wireless node device 170 obtained from their EDID-ROMs (not shown). Accordingly, each node device provided with a video output device or audio output device in the wireless communication system is identified by a pair of a device ID and an output device ID. The output device IDs are notified to the wireless node devices 120 and 130 operating as Source devices by the wireless node devices 110 and 170 operating as Sink devices, through a device capability response message 60 used in a device capability obtaining process.

Figure 35:
FIG. 35 is a diagram showing an exemplary connection information table in a connection information memory 125 of the wireless node device 120 in the wireless communication system according to the modification of the second embodiment of the present invention.
Figure 36:
FIG. 36 is a diagram showing an exemplary connection information table in a connection information memory 135 of a wireless node device 130 in the wireless communication system according to the modification of the second embodiment of the present invention.

In the present modification, when performing an output device selecting process of FIG. 28, priorities of all node devices provided with a video output device or audio output device are determined, instead of determining priorities of Sink devices. Further, a pair of an origination port number and a destination port number determined in the connecting process step S92 of FIG. 27, and a stream ID determined in the resource reserving process S94 are identified by a device ID and an output device ID. FIGS. 35 to 38 show respective connection information tables of the wireless communication system according to the modification of the second embodiment of the present invention. FIG. 35 is a diagram showing an exemplary connection information table in a connection information memory 125 of the wireless node device 120, FIG. 36 is a diagram showing an exemplary connection information table in a connection information memory 135 of the wireless node device 130, FIG. 37 is a diagram showing an exemplary connection information table in a connection information memory 115 of the wireless node device 110, and FIG. 38 is a diagram showing an exemplary connection information table in a connection information memory 175 of the wireless node device 170. Hence, a device ID and an output device ID identify an origination port number, a destination port number, a stream ID, input formats, and a priority which are associated with one another. Thus, the wireless node device 120 can communicate with a wireless node device that outputs video and audio data to a video output device or audio output device having the highest priority. In the case that video and audio data signals are transmitted from the wireless node device 120 or 130 operating as a Source device, the wireless node device 110 outputs the video and audio data signals to the wired node device 140 or 160 identified by an output device ID, according to the association between its port number and an output device. A video output device and an audio output device in one wireless node device or wired node device may be assigned with different output device IDs. Further, video output devices or audio output devices in one wireless node device or wired node device may be assigned with different output device IDs. Alternatively, one wireless node device or wired node device may be provided with only one of a video output device and an audio output device, and an output device ID may be assigned for identifying the output device.

In the exemplary configuration described with reference to FIGS. 28 to 33, the wired node devices 140 and 160 is hidden from the wireless node device 120 operating as a Source device. On the other hand, in the exemplary configuration described with reference to FIGS. 34 to 38 the wireless node device 120 operating as a Source device is aware of the wired node devices 140 and 160. The former configuration is useful in the case that a receiver adapter is connected with only one wired node device, or in the case that a receiver adapter is connected with a plurality of wired node devices, and determines to which one of the wired node devices video and audio data signals are to be outputted. On the other hand, the latter configuration is useful in the case that a receiver adapter has two or more output terminals, a transmitter is also informed of this fact, and the transmitter uses the information to select from which output of the receiver adapter signals are to be outputted. In general, a tree structure basically with a TV being a root is formed in HDMI. Thus, a receiver adapter basically does not have two HDMI output terminals, and even if it has, the receiver adapter only switches between its outputs and a transmitter can see only one output. In the example of FIGS. 28 to 33, since a receiver adapter (wireless node device 110) and one TV (wireless node device 170) can be considered to be comparable with each other, there is no need to add a device ID to the device capability memory 124 of FIG. 29.

Note that mere examples of the packet format of each message and the table formats of the device capability memory 124 and the connection information memories 115, 125, 135, and 175 are shown in the present embodiment, and thus, different formats can be used as long as they have similar effects. Note also that mere exemplary configurations of the wireless communication system, the wireless node devices, and the wired node devices are shown in the present embodiment, and thus, the configurations are not limited to those exemplary ones.

Note also that the functions of each wireless node device described in the first and second embodiments may be implemented as an integrated circuit chip, which is provided with a memory storing a program including the steps involved in the described processes, and a processor executing the program. Furthermore, the described functions of each wireless node device may be implemented as a module device, which is provided with a memory storing a program including the steps involved in the described processes, and a processor executing the program.

INDUSTRIAL APPLICABILITY

The wireless communication devices and wireless communication system according to the present invention have an effect of being able to automatically and wirelessly establish connections among wireless communication devices, and are useful as wireless node devices that efficiently perform video and audio data transmission among the wireless communication devices, etc.

The invention claimed is:

1. A wireless communication device that wirelessly transmits content data to a wireless receiving device, the wireless communication device comprising at least one port for wirelessly transmitting the content data,
   wherein the wireless communication device:
   determines an origination port number indicating a port for wirelessly transmitting the content data;
   communicates with the wireless receiving device to exchange (i), a destination port number determined by the wireless receiving device and indicating a port for wirelessly receiving the content data in the wireless receiving device, (ii) the origination port number determined by the wireless communication device, (iii) a first flag indicating whether or not the content data includes video data, and (iv) a second flag indicating whether or not the content data includes audio data;
   associates the origination port number with the destination port number;
   obtains one or more input formats of the content data supported by the wireless receiving device;
   reserves wireless resources for wirelessly transmitting the content data;
   determines one of the obtained input formats as an output format of the content data, and notifies the wireless receiving device of the determined output format; and
   wirelessly transmits the content data to the wireless receiving device through a pair of ports indicated by the origination port number and the destination port number associated with each other.

2. The wireless communication device as claimed in claim 1, wherein the wireless communication device and the wireless receiving device communicate with each other by using a millimeter-wave frequency band.

3. The wireless communication device as claimed in claim 1, wherein the input formats include at least one of a video input format and an audio input format supported by the wireless receiving device.

4. The wireless communication device as claimed in claim 1, wherein the input formats are obtained only when communicating with the wireless receiving device for a first time, and the obtained input formats are stored in a memory of the wireless communication device.

5. The wireless communication device as claimed in claim 1, wherein the reserved wireless resources include wireless resources required to wirelessly transmit the content data in the determined output format.

6. The wireless communication device as claimed in claim 5, wherein the reserved wireless resources further include wireless resources required to retransmit the content data.

7. The wireless communication device as claimed in claim 1, wherein, when there are a plurality of wireless receiving devices, the wireless communication device communicates with a predetermined wireless receiving device of the plurality of wireless receiving devices.

8. The wireless communication device as claimed in claim 7, wherein the predetermined wireless receiving device is a wireless receiving device comprising a video output device, or a wireless receiving device connected to a wired receiving device comprising a video output device.

9. The wireless communication device as claimed in claim 7, wherein the predetermined wireless receiving device is a wireless receiving device comprising an audio output device, or a wireless receiving device connected to a wired receiving device comprising an audio output device.

10. The wireless communication device as claimed in claim 1, wherein, when there are a plurality of wireless receiving devices, the wireless communication device communicates with a wireless receiving device, of the plurality of wireless receiving devices, having a highest priority.

11. The wireless communication device as claimed in claim 1, wherein, when there are a plurality of wireless receiving devices, the wireless communication device communicates with a wireless receiving device, of the plurality of wireless receiving devices, that outputs the content data to a video output device having a highest priority.

12. The wireless communication device as claimed in claim 1, wherein, when there are a plurality of wireless receiving devices, the wireless communication device communicates with a wireless receiving device, of the plurality of wireless receiving devices, that outputs the content data to an audio output device having a highest priority.

13. The wireless communication device as claimed in claim 1, wherein, when the wireless communication device detects a signal instructing playback of the content data, the wireless communication device transmits the origination port number to the wireless receiving device, and receives the destination port number transmitted from the wireless receiving device in response to the transmitted origination port number, so as to exchange the origination port number and the destination port number.

14. The wireless communication device as claimed in claim 1, wherein, when the wireless communication device receives, from the wireless receiving device, a signal including the destination port number and instructing playback of the content data, the wireless communication device transmits the origination port number to the wireless receiving device in response to the received destination port number, so as to exchange the origination port number and the destination port number.

15. The wireless communication device as claimed in claim 1,
wherein the wireless communication device is connected by a wire to at least one wired transmitting device that transmits the content data to the wireless communication device, and
wherein, when receiving, from the wired transmitting device, a content data transmission start signal notifying a start of transmission of the content data, the wireless communication device:
transmits the origination port number to the wireless receiving device, and receives the destination port number transmitted from the wireless receiving device in response to the transmitted origination port number, so as to exchange the origination port number and the destination port number; and
before wirelessly transmitting the content data to the wireless receiving device, wirelessly transmits the content data transmission start signal to the wireless receiving device through the pair of ports indicated by the origination port number and the destination port number associated with each other.

16. The wireless communication device as claimed in claim 15,
wherein the wired transmitting device is connected to the wireless communication device using HDMI, and
wherein the content data transmission start signal is an Active Source message.

17. A wireless communication device that wirelessly receives content data from a wireless transmitting device which is the wireless communication device as claimed in claim 1,
wherein the wireless communication device comprises at least one port for wirelessly receiving the content data, and
wherein the wireless communication device:
determines a destination port number indicating a port for wirelessly receiving the content data;
communicates with the wireless transmitting device to exchange (i) an origination port number determined by the wireless transmitting device and indicating a port for wirelessly transmitting the content data in the wireless transmitting device, (ii) the destination port number determined by the wireless communication device, (iii) a first flag indicating whether or not the content data includes video data, and (iv) a second flag indicating whether or not the content data includes audio data;
associates the origination port number with the destination port number;
notifies the wireless transmitting device of one or more input formats of the content data supported by the wireless communication device;
obtains, from the wireless transmitting device, one of the input formats determined by the wireless transmitting device as an output format of the content data; and
wirelessly receives the content data from the wireless transmitting device through a pair of ports indicated by the origination port number and the destination port number associated with each other.

18. The wireless communication device as claimed in claim 17, wherein the wireless communication device and the wireless transmitting device communicate with each other by using a millimeter-wave frequency band.

19. The wireless communication device as claimed in claim 17, wherein the input formats include at least one of a video input format and an audio input format supported by the wireless communication device.

20. The wireless communication device as claimed in claim 17, wherein, when the wireless communication device detects a signal instructing playback of the content data, the wireless communication device transmits the destination port number to the wireless transmitting device, and receives the origination port number transmitted from the wireless transmitting device in response to the transmitted destination port number, so as to exchange the origination port number and the destination port number.

21. The wireless communication device as claimed in claim 17, wherein, when the wireless communication device receives the origination port number from the wireless transmitting device, the wireless communication device transmits the destination port number to the wireless transmitting device in response to the received origination port number, so as to exchange the origination port number and the destination port number.

22. The wireless communication device as claimed in claim 17,
wherein the wireless communication device is connected by a wire to at least one wired receiving device that receives the content data from the wireless communication device, and
wherein when receiving, from the wireless transmitting device, a content data transmission start signal notifying a start of transmission of the content data, the wireless communication device transmits the content data transmission start signal to any one of the wired receiving devices.

23. The wireless communication device as claimed in claim 22,
wherein the wired receiving device is connected to the wireless communication device using HDMI, and
wherein the content data transmission start signal is an Active Source message.

24. A wireless communication system comprising:
a wireless transmitting device; and
a wireless receiving device, the wireless transmitting device wirelessly transmitting content data to the wireless receiving device,
wherein the wireless transmitting device comprises at least one port for wirelessly transmitting the content data,
wherein the wireless receiving device comprises at least one port for wirelessly receiving the content data, and
wherein, in the wireless communication system:
the wireless transmitting device determines an origination port number indicating a port for wirelessly transmitting the content data;
the wireless receiving device determines a destination port number indicating a port for wirelessly receiving the content data;
the wireless transmitting device communicates with the wireless receiving device to exchange the destination port number, (ii) the origination port number, (iii) a first flag indicating whether or not the content data includes video data, and (iv) a second flag indicating whether or not the content data includes audio data;
each of the wireless transmitting device and the wireless receiving device associates the origination port number with the destination port number;
the wireless receiving device notifies the wireless transmitting device of one or more input formats of the content data supported by the wireless receiving device;
the wireless transmitting device reserves wireless resources for wirelessly transmitting the content data;
the wireless transmitting device determines one of the obtained input formats as an output format of the content data,
the wireless transmitting device notifies the wireless receiving device of the determined output format; and
the wireless transmitting device wirelessly transmits the content data to the wireless receiving device through a pair of ports indicated by the origination port number and the destination port number associated with each other.

25. The wireless communication system as claimed in claim 24,
wherein the wireless transmitting device is connected by a wire to at least one first wired transmitting device that transmits the content data to the wireless transmitting device,
wherein the wireless receiving device is connected by a wire to at least one second wired receiving device that receives the content data from the wireless receiving device,
wherein, when the wireless transmitting device receives from the first wired transmitting device a content data transmission start signal notifying a start of transmission of the content data, the wireless transmitting device:
transmits the origination port number to the wireless receiving device, and receives the destination port number transmitted from the wireless receiving device in response to the transmitted origination port number, so as to exchange the origination port number and the destination port number; and
before wirelessly transmitting the content data to the wireless receiving device, wirelessly transmits the content data transmission start signal to the wireless receiving device through the pair of ports indicated by the origination port number and the destination port number associated with each other, and
wherein, when the wireless receiving device receives from the wireless transmitting device the content data transmission start signal notifying the start of transmission of the content data, the wireless receiving device transmits the content data transmission start signal to any one of the second wired receiving devices.

* * * * *